United States Patent [19]
Kawakami et al.

[11] Patent Number: 5,585,044
[45] Date of Patent: Dec. 17, 1996

[54] LIQUID TREATING METHOD AND LIQUID TREATING APPARATUS

[75] Inventors: Tomonori Kawakami; Masaru Matsui; Hiroe Sato; Mitsuo Hiramatsu; Shinichiro Aoshima, all of Hamamatsu, Japan

[73] Assignee: Hamamatsu Photonics K.K., Japan

[21] Appl. No.: 365,482

[22] Filed: Dec. 28, 1994

[30] Foreign Application Priority Data

Dec. 28, 1993 [JP] Japan .................................. 5-338529
Jul. 29, 1994 [JP] Japan .................................. 6-178407
Dec. 21, 1994 [JP] Japan .................................. 6-318199

[51] Int. Cl.$^6$ .................................................. B01D 47/00
[52] U.S. Cl. ........................ 261/1; 261/81; 261/DIG. 48
[58] Field of Search .................... 95/30; 96/175; 55/277; 261/81, DIG. 48

[56] References Cited

U.S. PATENT DOCUMENTS

| | | | |
|---|---|---|---|
| 4,085,170 | 4/1978 | Simpson et al. | 261/1 |
| 4,141,939 | 2/1979 | Oshima | 261/1 |
| 4,339,247 | 7/1982 | Faulkner et al. | 95/30 |
| 4,398,925 | 8/1983 | Trinh et al. | 95/30 |
| 4,793,714 | 12/1988 | Gruber | 261/84 |
| 5,032,027 | 7/1991 | Berliner, III | 261/DIG. 48 X |
| 5,092,268 | 3/1992 | Taylor | 261/81 X |

FOREIGN PATENT DOCUMENTS

| | | |
|---|---|---|
| 0584685 | 3/1994 | European Pat. Off. . |
| 4305660 | 9/1993 | Germany . |
| 61-227824 | 10/1986 | Japan . |
| 8203795 | 11/1982 | WIPO . |

OTHER PUBLICATIONS

Barber et al, "Resolving the Picosecond Characteristics of Synchronous Sonoluminescence", Journal Acoustical Society of America, vol. 91, No. 5, May 1992, pp. 3061–3063.
Patent Abstracts Of Japan, vol. 17, No. 158 (C–1041) Mar. 29, 1993 & JP-A-04 322 736 (Fujikura Ltd) Nov. 12, 1992.
Patent Abstracts Of Japan, vol. 12, No. 258 (C–513) Jul. 20, 1988 & JP-A-63 042 742 (Nippon Kokan KK) Feb. 23, 1988.
Patent Abstracts Of Japan, vol. 15, No. 344 (P–1245) Aug. 30, 1991 & JP-A-03 130 625 (Fuji Photo Film) Jun. 4, 1991.
Database WPI, Week 9324, Derwent Publications Ltd., London, GB; AN 93190932 & JP-A-5 115 898 (Shoei Pack) May 14, 1993.
Database WPI, Week 8647, Derwent Publications Ltd., London, GB; AN 86308721 & JP-A-61 227 824 (Osaka Gas) Oct. 9, 1986.

*Primary Examiner*—Robert J. Warden
*Assistant Examiner*—Krisanne M. Thornton
*Attorney, Agent, or Firm*—Cushman Darby & Cushman IP Group of Pillsbury Madison & Sutro, LLP

[57] ABSTRACT

The liquid treating method according to the present invention introduces a bubble into liquid phase and applies vibration waves, such as ultrasonic waves, from each sides of the bubble. Collision of the vibration waves with the bubble imparts the compression pressure to the bubble. This effect is used to dissolve a gas forming the bubble into the liquid phase or to improve liquid quality of this liquid phase.

16 Claims, 28 Drawing Sheets

ENLARGED VIEW OF A
IN Fig. 3A

SMALL TUBE
(INNER DIAMETER 500μm)

B-B SIDE VIEW
IN Fig. 3A

VIBRATOR (19 x 19 x 3mm)
(PIEZOELECTRIC VIBRATOR)

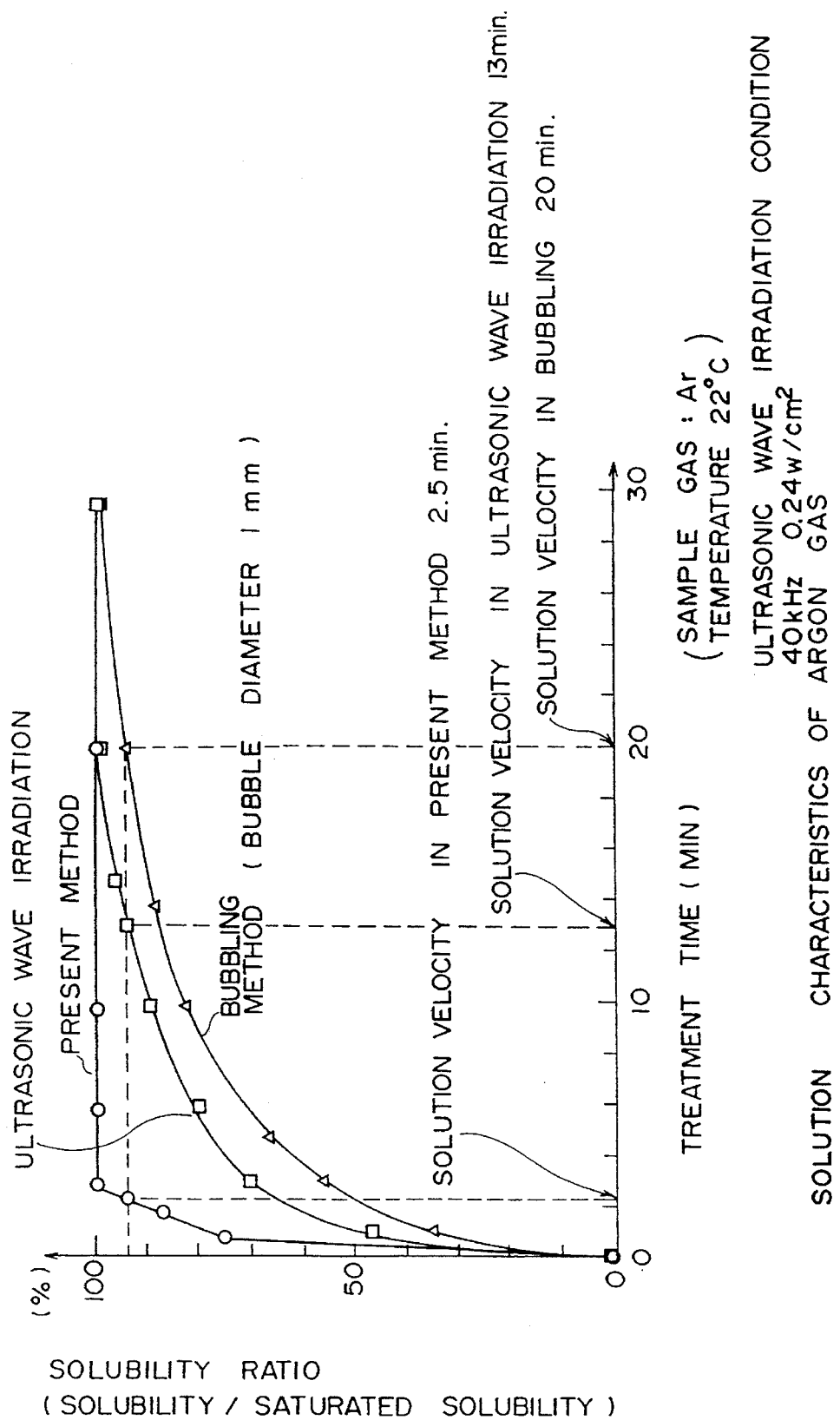

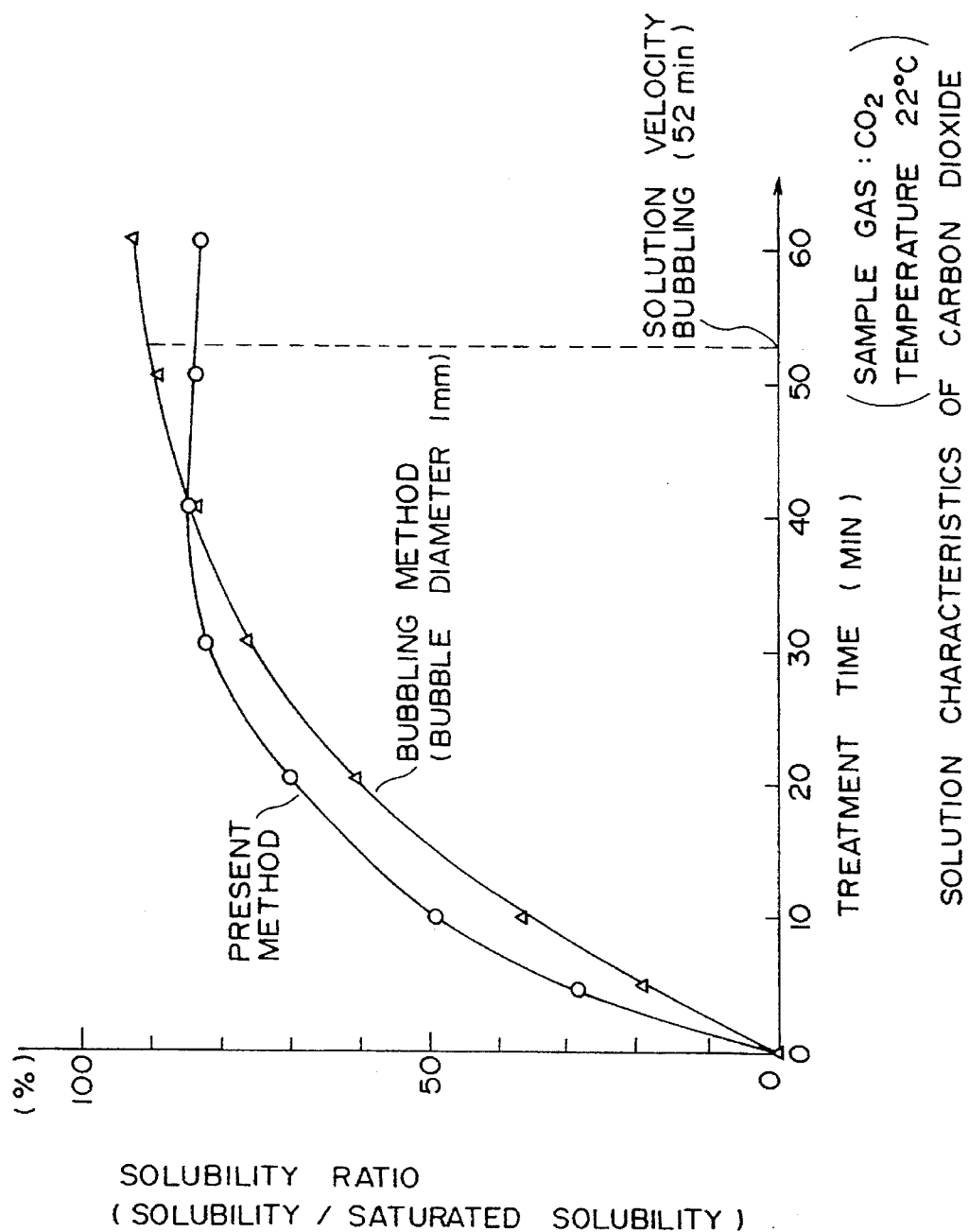

Fig. 6A
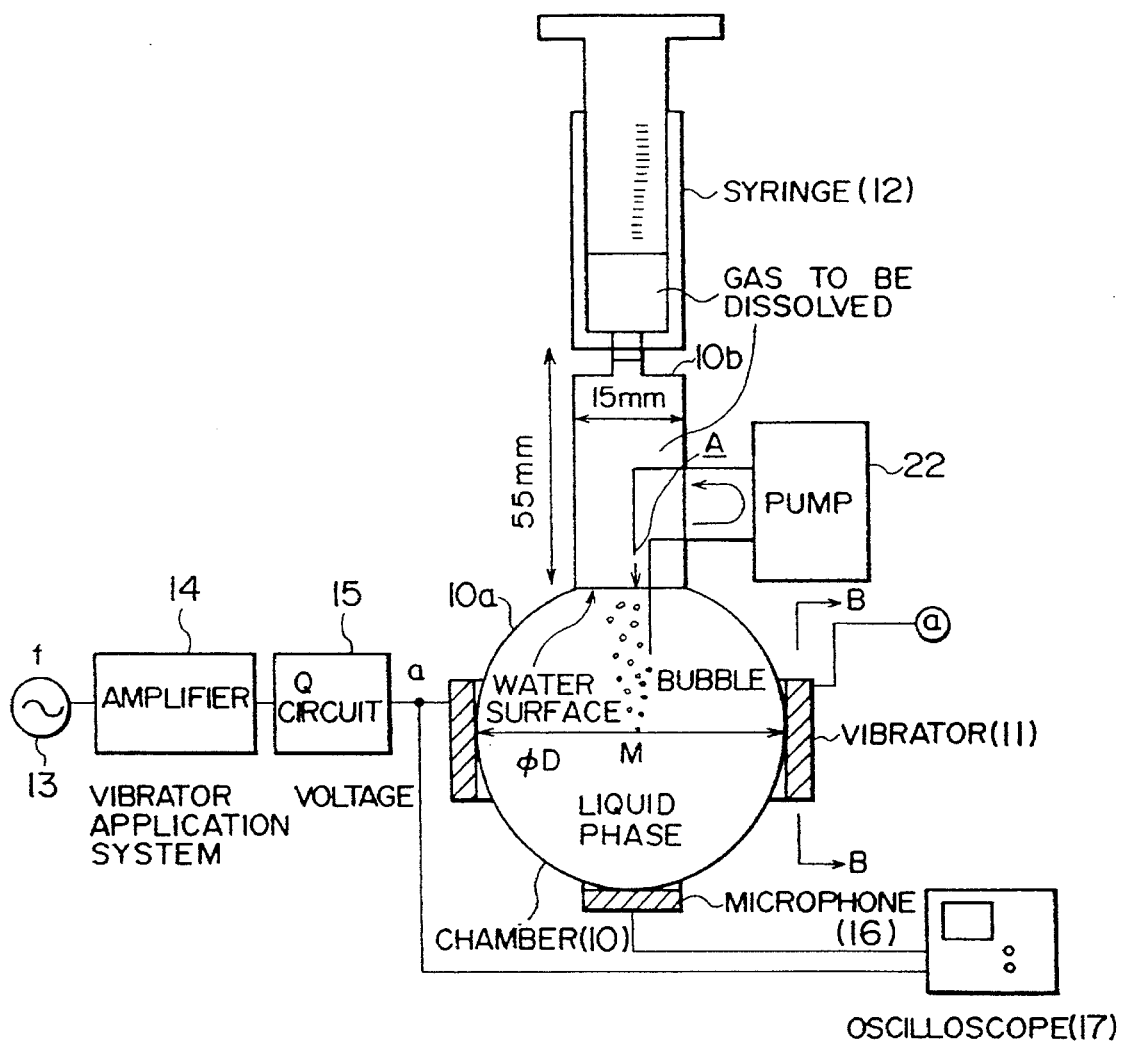
Fig. 6B
ENLARGED VIEW OF A
IN Fig. 6A
SMALL TUBE
(INNER DIAMETER 300μm)
Fig. 6C
B-B SIDE VIEW
IN Fig. 6A
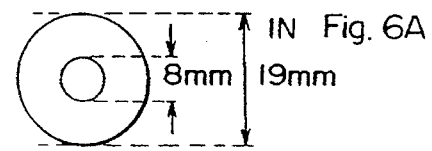
VIBRATOR (19 x 19 x 3mm)
(PIEZOELECTRIC VIBRATOR)

TREATMENT CONDITION: LIGHT OIL, D=4cm, Tm=22°C, $O_2$ GAS FLOW RATE 8cc/min, Vp-p = 800v TREATMENT CONDITION: LIGHT OIL, D=4cm, Tm=22°C, $O_2$ GAS FLOW RATE 8cc/min, Vp-p = 440v ENLARGED VIEW OF A IN Fig. 10A SMALL TUBE
(INNER DIAMETER 500μm)

B-B SIDE VIEW IN Fig. 10A

VIBRATOR (19 x 19 x 3mm)
(PIEZOELECTRIC VIBRATOR)

(T = 1 HOUR, Tm = 22°C)

( T = 1 HOUR , D = 5 cm )

ENLARGED VIEW OF A IN Fig.17A

SMALL TUBE
(INNER DIAMETER 500μm)

B-B SIDE VIEW IN Fig.17A

VIBRATOR (THICKNESS 3mm)

O: OPEN  C: CLOSE

| STEP | PROCESS | B1 | B2 | B3 | B4 | SUCTION PUMP |
|---|---|---|---|---|---|---|
| 1 | REMOVE GASES FROM TREATING UNIT | C | C | C | O | ON |
| 2 | INTRODUCE TREATED WATER | O | C | C | O | ON |
| 3 | STOP INTRODUCTION AFTER DETECTION OF WATER LEVEL | C | C | C | C | OFF |
| 4 | INITIATE TREATMENT AFTER GAS INTRODUCTION | C | C | O | C | OFF |
| 5 | STOP TREATMENT AFTER PREDETERMINED TIME PASSED |  |  |  |  | OFF |
| 6 | DISCHARGE TREATED WATER | C | O | O | O | OFF |

Fig. 23A

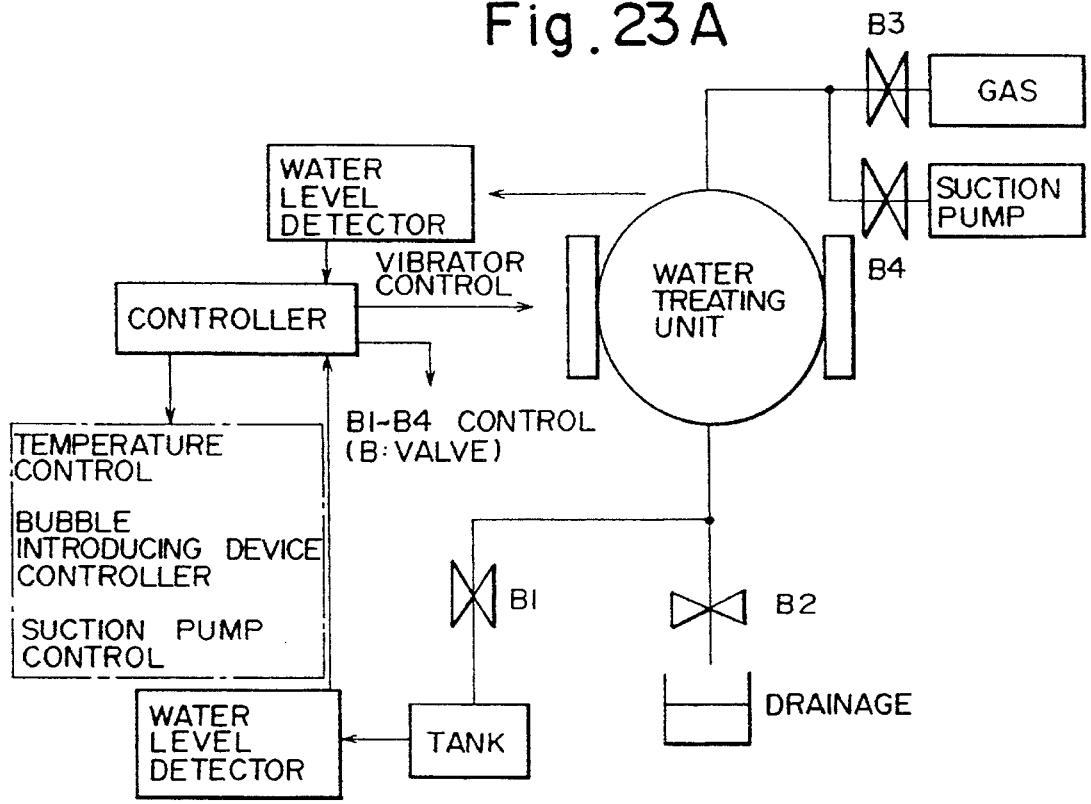

Fig. 23B

O: OPEN  C: CLOSE

| STEP | PROCESS | B1 | B2 | B3 | B4 | SUCTION PUMP |
|---|---|---|---|---|---|---|
| 1 | REMOVE GASES FROM TREATING UNIT | C | C | C | O | ON |
| 2 | INTRODUCE TREATED WATER | O | C | C | O | ON |
| 3 | STOP INTRODUCTION AFTER DETECTION OF WATER LEVEL | C | C | C | O | ON |
| 4 | START DEAERATION OPERATION | | | | | ON |
| 5 | STOP OPERATION AFTER PREDETERMINED TIME PASSED | | | | | OFF |
| 6 | INITIATE TREATMENT AFTER GAS INTRODUCTION | C | C | O | C | OFF |
| 7 | STOP TREATMENT AFTER PREDETERMINED TIME PASSED | | | | | |
| 8 | DISCHARGE TREATED WATER | C | O | O | C | OFF |

WATER ABSORPTION CHARACTERISTICS OF SOY BEAN

TREATMENT CONDITION : T = 1 HOUR, $O_2$, Vp p=800v, D=5cm
15 SOY BEANS (6.2g)

LIQUID TREATING METHOD AND LIQUID TREATING APPARATUS

BACKGROUND OF THE INVENTION

1. Field of the Invention

The present invention relates to a liquid treating method and a liquid treating apparatus that are applicable in the fields involving gas dissolution such as hydroponic industries. More specifically, the present invention relates to a method and an apparatus for dissolving gas into liquid or improving liquid quality by colliding vibration waves, such as ultrasonic waves and sound waves, to bubbles.

2. Related Background Art

To dissolve a gas or gasses into a liquid phase is one of the important steps in various fields. For example, addition of oxygen to water can improve efficiency of hydroponic cultivation, enhance effective feeding of oxygen to cultured fishes, shells and so on in a farm, and reduce a fermentation period required to fermentate beer, whisky, Japanese sake, soy source, breads, and tofu.

Gas introduction into a liquid phase is typically achieved by releasing it through a gas diffusing pipe into the liquid phase to form bubbles. To increase gas-absorbing efficiency of the liquid through such bubbling, Japanese Patent Laid Open No. 61-227824 proposes irradiation of ultrasonic waves to the bubbles to make the latter fine.

On the other hand, Japanese Patent Laid Open No. 5-115898 discloses a water treating method, in which the water is subjected to ultrasonic waves, magnetic fields, and far-infrared radiation successively in this order.

However, the former two methods are disadvantageous by the efficiency considerations. More specifically, these methods allow the bubbles to be dissolved spontaneously into the liquid phase. This means that a solution velocity of the bubbles into the liquid phase is decreased as the liquid phase becomes closer to saturation, increasing the gas proportion therein. The liquid phase hence reaches saturation only after a long-time bubbling of the gas.

In addition, the latter method of treating water has no specific disclosure on an ultrasonic treatment.

Accordingly, an object of the present invention is to provide a method and an apparatus for dissolving a gas effectively into a liquid phase.

Another object of the present invention is to provide effective method and apparatus for improving liquid quality with vibration waves.

SUMMARY OF THE INVENTION

The present inventors had made tremendous studies. As a result, it has been found that a dissolution efficiency of gas or gases into liquid phase is improved remarkably by making the bubbles compress instantaneously by means of colliding the vibration waves to the bubbles from each side of the bubbles. It has also been found that liquid quality is improved by forming a high-temperature and high-pressure field within the bubbles by means of colliding the vibration waves thereto.

The liquid treating method according to the present invention is based on the above mentioned findings. More specifically, this method is characterized by forming the bubbles of gas in liquid and applying a compression pressure to these bubbles by means of colliding the vibration waves to the bubbles from each side thereof.

Also, the present invention provides an apparatus for treating liquid by using vibration waves including sound waves and ultrasonic waves. This apparatus comprises:

a liquid treating container for holding liquid to be treated in;

vibration generators disposed on the symmetrical sides of the liquid treating container with respect to the center of the container; and bubble introducing means for introducing a bubble into the liquid contained in the liquid treating container;

wherein said bubble introducing means introduce the bubble into the liquid, and said vibration generators generated the vibration waves in the direction of the center of the liquid treating container; and wherein the vibration waves collide with the bubble from each side thereof so as to apply compression pressure to the bubble.

Application of the compression pressure to the bubbles by using the vibration waves permits dissolution of a gas forming the bubbles into the liquid as well as improvement of the liquid quality.

Generally, the vibration waves such as ultrasonic waves and sound waves are used for releasing dissolved gases in liquid or liquid phase. On the contrary, the present invention uses the vibration waves to create a high pressure instantaneously within the bubble by means of colliding the vibration waves to the bubble from each side thereof. The bubbles are thus pressurized and forced, for instance, to be dissolved into the liquid phase. As a result, it becomes possible to dissolve the gas into the liquid phase (as long as the liquid phase reaches saturation) for a shorter period as compared with conventional methods.

BRIEF DESCRIPTION OF THE DRAWINGS

FIG. 4 is a graph illustrating solubility characteristics of argon to a liquid phase achieved according to Embodiment I-1;

FIG. 5 is a graph illustrating solubility characteristics of carbon dioxide to a liquid phase achieved according to Embodiment I-1;

FIG. 6A is a diagrammatic side sectional view illustrating a liquid treating apparatus according to another embodiment of the present invention;

FIG. 6B is an enlarged view of a small tube;

FIG. 6C is a side view or a vibrator;

FIG. 23A is a block diagram of a liquid treating apparatus for liquid modification according to yet another embodiment of the present invention;

FIG. 23B is a process table indicating operational steps carried out by the apparatus in FIG. 23A;

Figure 1:
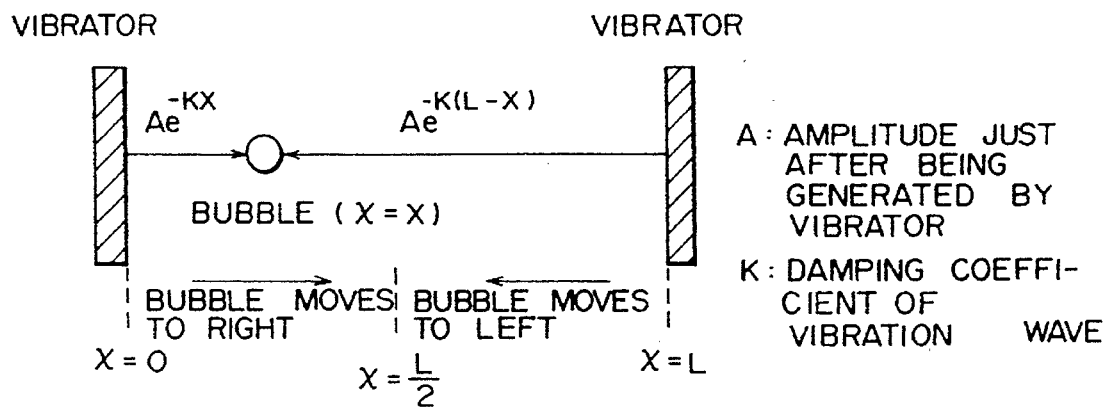
FIG. 1 is a diagrammatic side sectional view for use in describing the principle of a liquid treating method according to the present invention.

The present inventions is described in detail below with reference to the drawing as the need arises.

Figure 2:
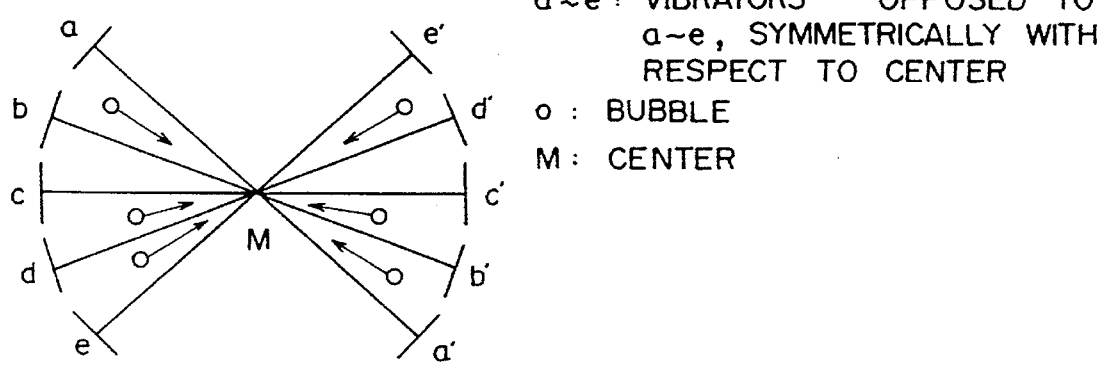
FIG. 2 is a diagrammatic plan sectional view for use in describing the principle of a liquid treating method according to the present invention, in which a plurality of vibrators are arranged.

FIGS. 1 and 2 are diagrammatic sectional view for use in describing a principle of compression caused to bubble by means of collision of the vibration waves to the bubble and resultant movement of the bubbles. Referring to FIG. 1, two piezoelectric vibrators, as the vibration generators, are arranged oppositely. These vibrators are away from each other by a distance L. A bubble positioned between the vibrators receives an instantaneous pressure (moving pressure) P by every vibration of the vibrators. The pressure is represented by the following equation, assuming that a left-to-right direction is a "positive" direction:

$$P = A \exp(-kx) - A \exp\{-k(L-x)\} \quad (1)$$

where A is an amplitude of the vibration wave just after being generated by the vibrator, k is a damping coefficient of the vibration wave, and x is a position (x-coordinate) of the bubble away from the left vibrator.

As apparent from the above equation (1), the bubble receives a pressure P>0 and thus moves to the right when positioned in a range of $0<x<(L/2)$. On the other hand, the bubble receives a pressure P<0 and thus moves to the left when positioned in a range of $(L/2)<x<L$. At the position of $x=L/2$, the bubble stops because the pressure becomes P=0. In this event, the bubble receives a compression pressure of "$A \exp(-kL/2)$".

FIG. 2 is a diagrammatic plan view illustrating vibrators "a" through "e" and their associated vibrators "a'" through "e'" aligned circumferentially. The vibrators "a" through "e" are opposed to the vibrators "a'" through "e'", respectively. More specifically, the vibrators indicated by like symbols ("a" and "a'", "b" and "b'") are symmetric with respect to the center M. A bubble (indicated by a white circle), if positioned between the vibrators "a" through "e" and "a'" through "e'", receives the pressure represented by the equation (1) from each pair of the vibrators. The bubble thus moves toward the center M (in the direction depicted by the arrow in the figure) as it is "swallowed up by or sucked into" the center of the circle. The vibration waves (generated by the vibrators a through e and a' through e', respectively) are superposed on each other at or around the center M, producing a significantly strong vibration wave. As a result, a significantly high pressure is applied to the bubble, allowing dissolution of the bubble into the liquid (the liquid phase) at a higher rate. In addition, collision of the strong vibration waves forms a high-temperature and high-pressure field within the bubble positioned at or around the center M. This provides effective improvement of the liquid quality surrounding the bubble.

With a plurality of vibrators arranged on a sphere symmetrically with respect to the center of the sphere, the bubbles are sucked into the center of the sphere and compressed at a higher pressure. The bubbles are thus dissolved into the liquid phase at a higher rate. The same phenomenon occurs when a spherical chamber resonates and the entire chamber is vibrated.

In FIG. 1, the present invention has thus been described in conjunction with the case where two vibration generators are used to generate the vibration waves. However, compression of the bubble according to the present invention may be achieved by using the vibration waves generated by a single vibration generator. On this case, the vibration waves generated from the single vibration generator, are made to collide against reflected vibration wave generated by reflecting the vibration wave with any one of known methods.

Liquid Phase

The liquid phase (or liquid) served to the dissolution of the gas is not limited to a specific one as long as it is in a liquid state at a temperature at which the gas is dissolved thereinto. Examples of such liquid phase include inorganic liquids such as water; organic liquids or organic solvents such as gasoline, light oil and alcohols; culture solutions used in enzyme and fermentation technologies; solutions or liquids containing activated sludge mixtures used in effluent treatment; alkaline solutions for use in absorbing SOx or NOx upon treatment of exhaust gases; media used in gas entraining reaction; and a mixture or composition of these liquids.

In this event, a temperature of the liquid phase may be in a range from a solidfying point to around a boiling point thereof. Considering reproducibility and a point where a solubility (the amount of dissolved gas) characteristic of the gas becomes stable, it is preferable that the temperature is in a range from that higher by at least 0° C. than the solidifying point to that lower by approximately 20° C. than the boiling point. More specifically, the temperature range comes to from 0° C. to 80° C. when the liquid phase used is water. Typically, the amount of the bubbles generated by the vibration wave (such as the ultrasonic wave) is balanced with an amount of the bubbles dissolved into a liquid phase by using the method according to the present invention at a certain temperature around the boiling point.

Gas to be dissolved

The gas (gas forming a bubble) dissolved into or absorbed by the above mentioned liquid phase is not limited to a specific one as long as it is in a gaseous state at a temperature when dissolved into the liquid phase. Examples of such gas include air or other gases such as oxygen forming the air used in the enzyme technology and the effluent treatment; inorganic gases such as SOx and NOx associated with the treatment of exhaust gases; various gases used as reagents for chemical reactions; and ozone used for sterilizing treatment or the like.

The present invention is particularly suitable for a case where a gas to be dissolved has a relatively low saturated solubility for the liquid phase. It is preferable that such gas has a saturated solubility of 0.2 cm$^3$ or lower (more preferably, 0.1 cm$^3$ or lower) to 1 cm$^3$ of the liquid phase at 20° C. When the liquid phase is water, examples of the gas satisfying this condition include gases containing an oxygen atom or atoms such as oxygen and ozone; inorganic gases such as argon and krypton; organic compound gases such as ethylene; and nitrogen.

Improvement of liquid quality

A surroundings with high-temperature and high-pressure may change gathering of molecules of aqueous liquid (particularly water). Otherwise, it may cleave an O—H bond between water molecules, producing activated oxygen species such as OH and hydrogen peroxide. In the present invention, whether liquid quality is improved or not, is assessed according to the amount of the activated chemical species produced in the liquid to determine "a degree of the improved liquid quality". This assessment was conducted according to results obtained through a luminol test (luminol-dependent chemiluminescence test). The luminol test is used commonly to determine quantitatively an activated chemical species such as an activated oxygen species.

This method is widely used for quantitative determination of oxides, utilizing luminol's nature of emitting light upon being oxidized. More specifically, a predetermined amount of a sample solution is mixed with a luminol solution in a dark room. The amount of light emitted upon mixing is determined by using a photon counter. While the oxides are produced in the liquid during the "improvement of liquid quality" as mentioned above, a type of the oxide is not determined. With this respect, a density of the oxide is converted into a density of hydrogen peroxide having similar or equivalent oxidizing capabilities. A specific technique of conversion is as follows: a luminol light emitting amount is determined for hydrogen peroxide at each density. The measurement results are used to determine the density of hydrogen peroxide that corresponds to the luminol light emitting amount detected from the modified liquid.

In the present invention, considering experimental results described below as well as other assessment results, a liquid quality is considered as being improved when the amount of the activated chemical species in liquid is at least about $3 \times 10^{-5}$ mol/l or more in a conversion into the amount of hydrogen peroxide.

Gas used for improving of liquid quality

Figure 11:
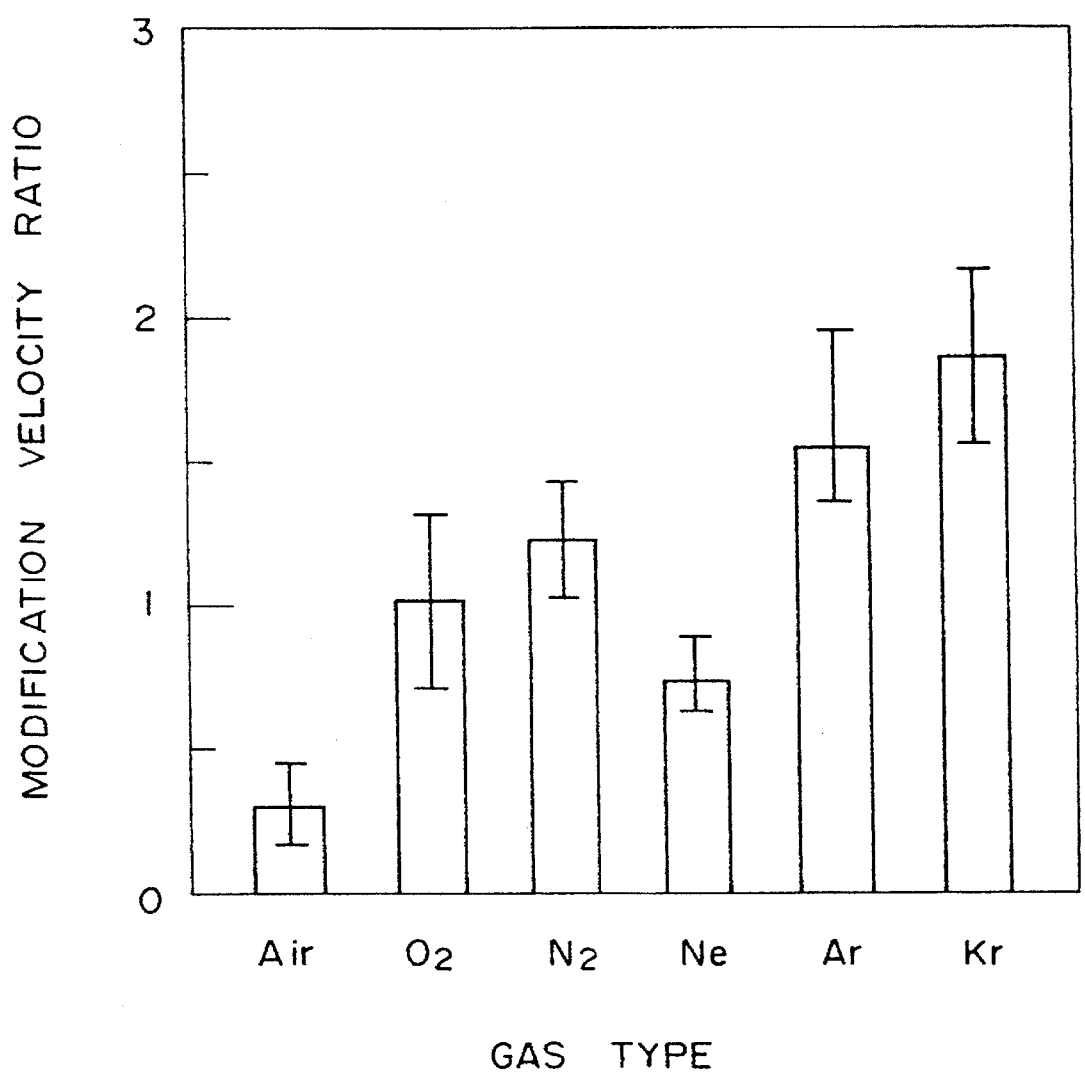
FIG. 11 is a graph illustrating a modification velocity ratio of water for various gases.

Any gases may be applied to the improvement of a liquid quality (it is described as "modification" that a liquid quality is improved, herein below). For example, the gas may be air, oxygen, nitrogen, neon, argon, or krypton. FIG. 11 shows a modification velocity ratio for various gases. The modification velocity was obtained by means of determining quantitatively the amount of oxides, which is produced under the surroundings with high-temperature and high-pressure, according to the luminol test. The modification velocity ratio indicates a ratio of the modification velocity to the reference modification velocity of 1 under the following conditions: chamber inner diameter D=5 cm; treatment time T=1 hour; introduced gas, oxygen; and treatment temperature Tm=22° C. The amount of the activated chemical species is referenced to the amount thereof at a modification velocity of 1. This reference amount is $3 \times 10^{-5}$ M/hour (M=mol/l), converted into an amount of hydrogen peroxide. From a point of preventing a chemically reactive substance or substances in the gaseous state from being dissolved and contaminated into the liquid phase, it is preferable to use noble gases that are stable chemically under the surrounding with the high-temperature and high-pressure. In addition, it is preferable that the noble gas used has a higher solubility to the liquid phase by the consideration of the modification velocity.

Bubbles

The bubbles may be formed by using any one of adequate known methods without any specific limitations. For example, the gas may be introduced into the liquid phase to form the bubbles by using a gas diffusion pipe (including a nozzle or a small tube). Alternatively, a liquid column may be knocked against a surface of the liquid phase to form the bubbles.

In this event, described is an effect of bubble introduction into the liquid for its modification (see FIG. 2). As mentioned above, upon introduction into the liquid, a bubble (indicated by a small white circle) receives a pressure due to the vibration waves and moves towards the center M. A significantly strong vibration wave is formed of superposed vibration waves at or around the center M. Accordingly, the bubbles moved near the center M are compressed at a significantly high pressure due to collision with the strong vibration waves. As a result, gas molecules in the bubbles have a large motion energy. It is expected that a molecular bond of the liquid is cleaved upon collision of the gas molecules having such large motion energy with the liquid at an interface of the bubble, which promotes the modification of the liquid.

A modification velocity was determined under the same conditions as FIG. 11 except that no bubble was introduced. A modification velocity at that time was about $2.5 \times 10^{-8}$ M/hour (M=mol/l), which was approximately $\frac{1}{1200}$ of the case with the bubbles introduced. This result shows that introduction of bubbles into the liquid permits more effective modification of the liquid.

Chamber

A chamber (or a container) may have any configuration as long as it can hold or store the liquid phase in. However, it is preferable that the chamber has a resonatable configuration from the points of allowing enlargement of an amplitude of the vibration wave by using resonance and formation of a local, strong vibration wave from the superposed vibration waves. The "resonatable configuration" may be, for example, a configuration with parallel planes (e.g., rectangular parallelepiped), a cylinder, or a sphere. It is particularly preferable to use a spherical chamber from the points of allowing effective compression and dissolution of the bubbles at and around the center of the chamber and allowing formation of a local field of the strong vibration wave.

In the present invention, the above mentioned chambers may be connected with each other. For example, the spherical chambers may be connected in series. It is preferable to use a plurality of chambers from the points of dissolving the gas while flowing the liquid phase and of increasing an amount of the liquid to be treated.

Though depending on conditions such as a type of the liquid phase used, an amplitude and a frequency of the vibration wave, it is preferable that the maximum dimension (of height, width, and depth) of the chamber is from 1 to 10 cm (more preferably, from 2 to 7 cm). A distance between the vibrator and the center of the chamber becomes longer in a larger chamber, causing a significant attenuation of vibration at or around the center. On the contrary, a smaller chamber has only a smaller surface area than can be used to vibrate the liquid phase from outside. As a result, the vibration waves at or around the center have an insufficient, low strength.

More specifically, it is preferable that the spherical chamber has a diameter of from approximately 2 to 7 cm when the liquid phase used is water.

Figure 12:
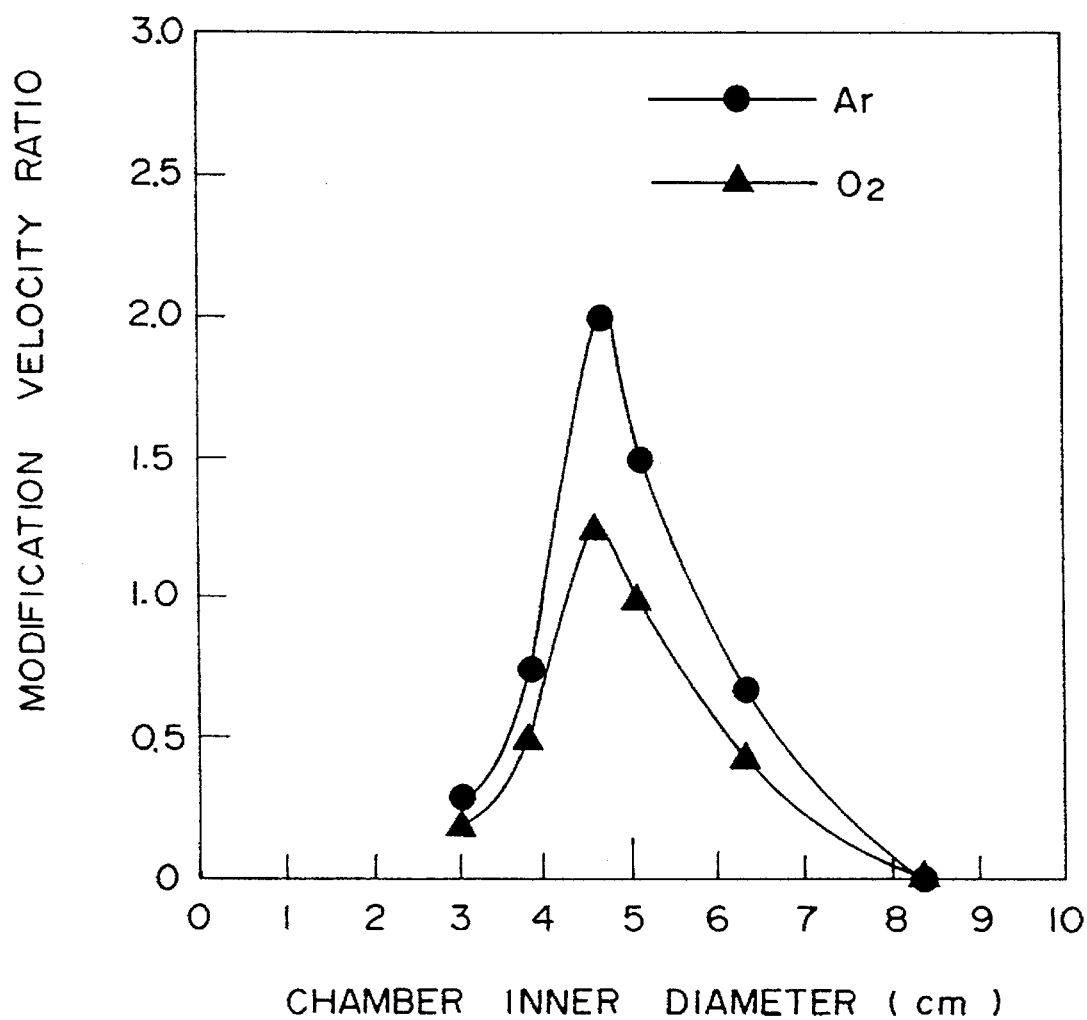
FIG. 12 is a graph illustrating the modification velocity ratio of water as a function of an inner diameter of a chamber.

FIG. 12 shows the modification velocity ratio as a function of an inner diameter of the chamber. It is preferable that the chamber has a diameter of approximately from 3 to 7 cm (more preferably, from 4 to 6 cm), though the size of the chamber depends on the properties of the vibrators used. With the chamber having a larger diameter, the vibration wave is required to propagate a larger distance before in reaches a bubble. This means that the vibration wave is deteriorated significantly. As a result, it becomes impossible to form effectively the high-temperature and high-pressure field. On the contrary, the chamber having a smaller diameter causes a resonance frequency of the chamber to increase. As a result, it becomes impossible to enhance the amplitude of the vibration wave.

A material of the chamber is not specifically limited as long as the chamber can hold or store the liquid phase in where the gas is to be dissolved. However, it is preferable that the chamber is made of such a material that passes through vibration waves (particularly ultrasonic waves) effectively when the vibrators are arranged outside the chamber. Specific examples of the material of the chamber include glass, quartz, metals, ceramics, and plastics.

It is preferable that the chamber has as small a thickness as possible from the point of restricting reduction of the amplitude of the vibration wave as long as the thickness can provide a chamber of such a sufficient strength that prevent it from being broken by the oscillation. More specifically, it is preferable that the chamber is approximately 1 mm thick when made of glass.

Vibration Generator

The vibration generator (vibrator) is not limited specifically in material, configuration, and structure as long as it can provide the vibration wave to the liquid phase. While the number of the vibration generator may be one, it is preferable to use an even number (two or more) of the vibration generator such as four or more, or six or more with two or more vibration generators arranged, it is preferable that two vibration generators among them are disposed on the symmetrical sides of the center of the chamber.

The above mentioned chamber itself may be composed of the vibration generators. Alternatively, a part of the chamber is formed by the vibration generators. The vibration generators may be located outside or inside the chamber. In this event, the vibration generators may be disposed on an outer surface (wall) of the chamber, an inner surface of the chamber, or in the liquid phase within the chamber.

In case of providing a piezoelectric vibrator as the vibration generator, a driving voltage applied to the vibrator may have any waveform. More specifically, the waveform may be pulsed, sinusoidal, square, or rectangular. With a plurality of vibrators, it is preferable to apply the same driving voltage to all these vibrators simultaneously.

Vibration Wave upon Dissolution

The vibration wave is required to have an amplitude that is larger than an amplitude with which the bubble captured (trapped) by the vibration waves incoming from the each sides of the bubble, starts to be dissolved into the liquid phase (at that trapped position). A higher solution velocity of the gas can be provided with a larger amplitude of the vibration wave. However, the amount of the bubbles generated by the vibration waves is balanced (into equilibrium condition) with the amount of the bubbles dissolved into a liquid phase with certain types of the liquid phase and/or the gaseous phase. Accordingly, the vibration wave typically has an upper limit in amplitude.

It is preferable that a frequency of the vibration wave is the same for at least a pair of the vibration generators, considering the symmetricity of the colliding vibration waves. In addition, the frequency are preferably the same for all the vibration generators used. The frequency of the vibration wave may generally be from 1 Hz to 1 GHz, and preferably from 10 kHz to 10 MHz (particularly from 20 kHz to 1 MHz). Typically, an inaudible sound wave having a frequency of above 15 kHz is considered as an ultrasonic wave. The frequency is preferably from 20 kHz to 70 kHz when the liquid phase is water (aqueous liquid).

When using a strong vibration wave generated by the resonance of the chamber, it is preferable that the vibration wave has a frequency that is n * f, where n is an integer and f is a fundamental resonance frequency represented by the following equation:

$$f = V/D \text{ (Hz)} \quad (2),$$

where V represents a sound wave velocity (m/sec) of the vibration wave through the liquid phase, and D represents an inner diameter (m) of the chamber. As apparent from the above equation, the resonance frequency f is determined according to the inner diameter of the chamber and the sound wave velocity of the vibration wave through the liquid phase.

In the present invention, it is preferable to use the resonance phenomenon of the vibration waves to enhance the efficiency of the gas dissolution or to reduce a consumption energy. The term "resonance" used herein means a phenomenon that the amplitude of the vibrating system increases rapidly when vibration frequencies of a cyclic external force become close to a natural vibration frequency of that vibrating system. In the present invention, an amplitude by vibration in the chamber may be monitored according to voltage values supplied from a detector such as a microphone or a piezoelectric element disposed on the chamber. A voltage of the maximum level is obtained from the detector and the smallest current is supplied to the vibrators, when the chamber is in the optimum resonance condition.

Pressure

The solubility of the gas to the liquid phase (the amount of the dissolved gas) is larger with a higher pressure. In the present invention, the bubbles are subjected to a larger compression pressure (due to the superposed vibration waves) as positioned closer to the center of the chamber. This compression pressure may be determined according to a compression ratio obtained through measuring a diameter of the compressed bubble under a condition where the gas is hardly dissolved into the liquid phase (such as a saturated condition, or a condition where the liquid phase is high in temperature). The bubble diameter may be determined based on, for example, scattering of a laser beam (preferably having a wavelength of from 400 nm to 700 nm). According to the findings of the present inventor, the compression pressure is reached to a maximum at thousands of atmospheres in embodiments described below.

Liquid Treating Apparatus for Gas Dissolution

Figure 3A:
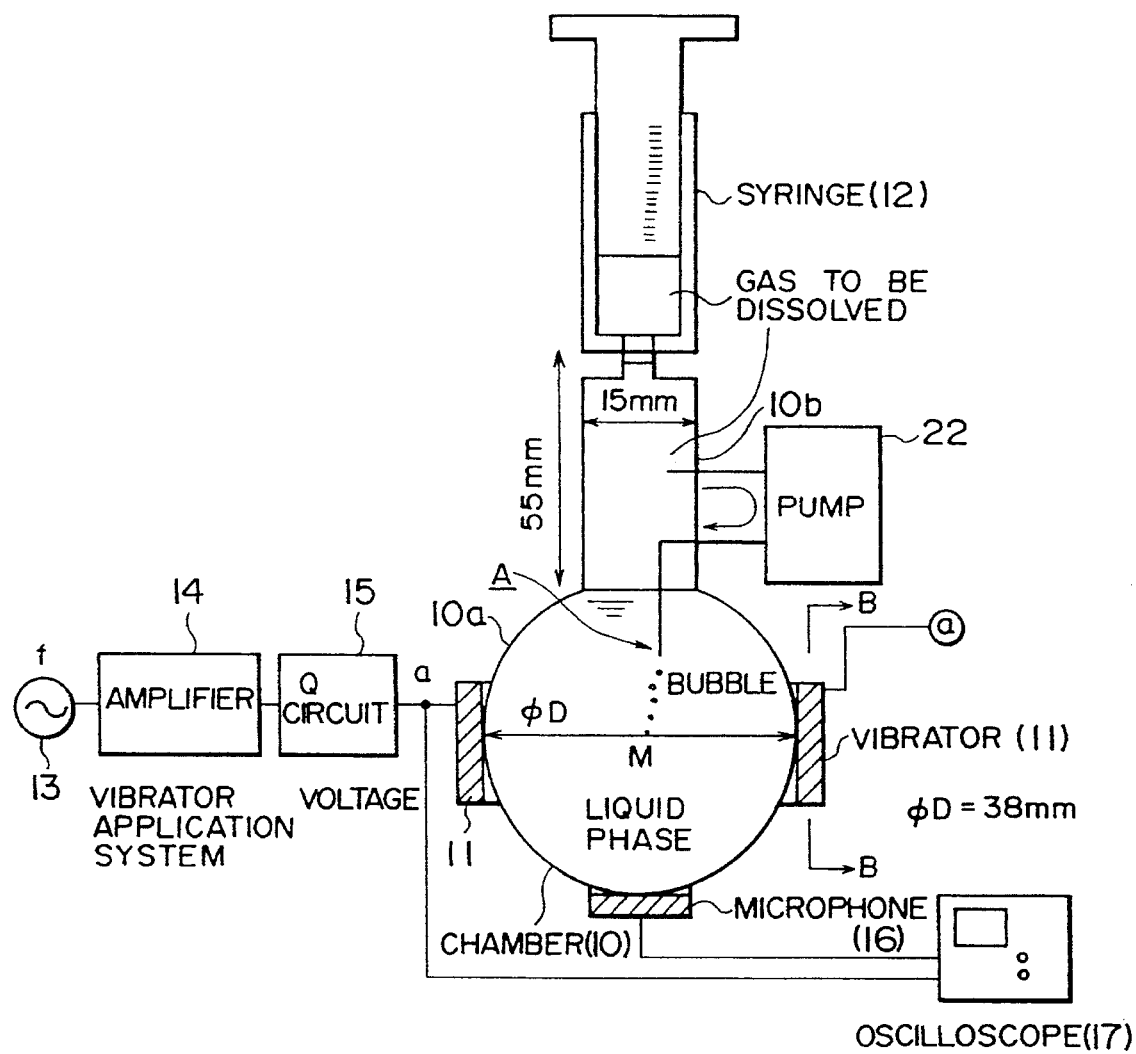
FIG. 3A is a diagrammatic side sectional view illustrating a liquid treating apparatus according to an embodiment of the present invention.
Figure 3B:
FIG. 3B is an enlarged view of a small tube.
Figure 3C:
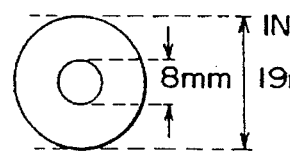
FIG. 3C is a side view of a vibrator.

FIG. 3A is a diagrammatic side sectional view of a liquid treating apparatus according to an embodiment of the present invention. FIG. 3B is an enlarged view of "A" (small tube) in FIG. 3A while FIG. 3C is an enlarged view of a vibrator (e.g., piezoelectric vibrator).

Referring to FIG. 3A, the liquid treating apparatus comprises a chamber 10, vibrators 11, and a small tube "A". The chamber 10 comprises a liquid containing unit 10a and a gas filling unit 10b, which is for holding or storing liquid in. The vibrators 11 are disposed oppositely on the sides of the chamber 10 for use in applying vibration waves to the liquid. The small tube "A" is used for forming bubbles in the liquid. In such liquid treating apparatus, the bubbles are compressed by using collision of the vibration waves with each other in the chamber 10. As a result, the gas forming these bubbles is dissolved into the liquid.

A volume of the gas dissolved into the liquid may be determined according to the scale on a syringe 12 containing this gas. In FIG. 3A, only a single pair of (two) vibrators 11 are disposed on the opposite sides of the chamber 10, symmetrically with respect to the center thereof. The vibrators 11 are connected to an vibrator voltage application system which comprises an oscillator 13, an amplifier 14 and a Q circuit 15. The oscillator 13 supplies a current to the amplifier 14. The amplifier 14 amplifies that current, while the Q circuit 15 enhances a specific frequency to produce a vibration current. The vibration current is then supplied to the vibrators 11. A microphone 16 serving as vibration waves detecting means is disposed on the bottom of the chamber 10. The waveforms of the vibration wave detected by the microphone 16 are monitored by an oscilloscope 17. The oscilloscope 17 also monitors the waveforms of the vibration current supplied from the Q circuit 15 to the vibrators 11.

In the apparatus illustrated in FIG. 3A, a strong vibration wave can be generated in the chamber 10 by means of resonance of the vibration waves when the vibrators 11 are operated at the resonance frequency f (f=V/D) determined according to the chamber diameter D and the propagation velocity V of the vibration wave in water. The strong vibration wave causes the bubbles floated up from the end of the small tube "A" to be sucked into the center of the sphere, with their dimension reduced. The small tube "A" is vibrated as the chamber resonates, allowing to release smaller bubbles into the liquid phase. The vibration waves propagated from the inner surface of the chamber 10 are superposed locally on each other at or around the center of the spherical chamber. As a result, the bubbles receive a strong compression pressure and are dissolved into the liquid at a high rate. In this event, the bubbles are sucked into the center of the spherical chamber. The content of the chamber is agitated or stirred due to this movement of the bubbles. Accordingly, a density of the gas dissolved becomes uniform in the entire liquid.

FIG. 6A is a diagrammatic side sectional view of a liquid treating apparatus according to another embodiment of the present invention. FIG. 6B is an enlarged view of "A" (small tube) in FIG. 6A while FIG. 6C is an enlarged view of a vibrator (e.g., piezoelectric vibrator).

Referring to FIG. 6A, the liquid treating apparatus of this embodiment is similar in structure to the one illustrated in FIG. 3A except that the bubble forming means forms bubbles, by means of knocking a liquid dropped from the small tube "A", which tube is provided with the gas filling unit 10b, against the surface of the liquid phase within the liquid containing unit 10a. The liquid knocked against the liquid phase may be the same or different from the latter. In addition, the liquid may be knocked against the liquid phase as a continuous liquid column or as intermittent drops thereof. Such liquid knocking has an advantage of easy formation of small bubbles (fine bubbles).

Figure 10A:
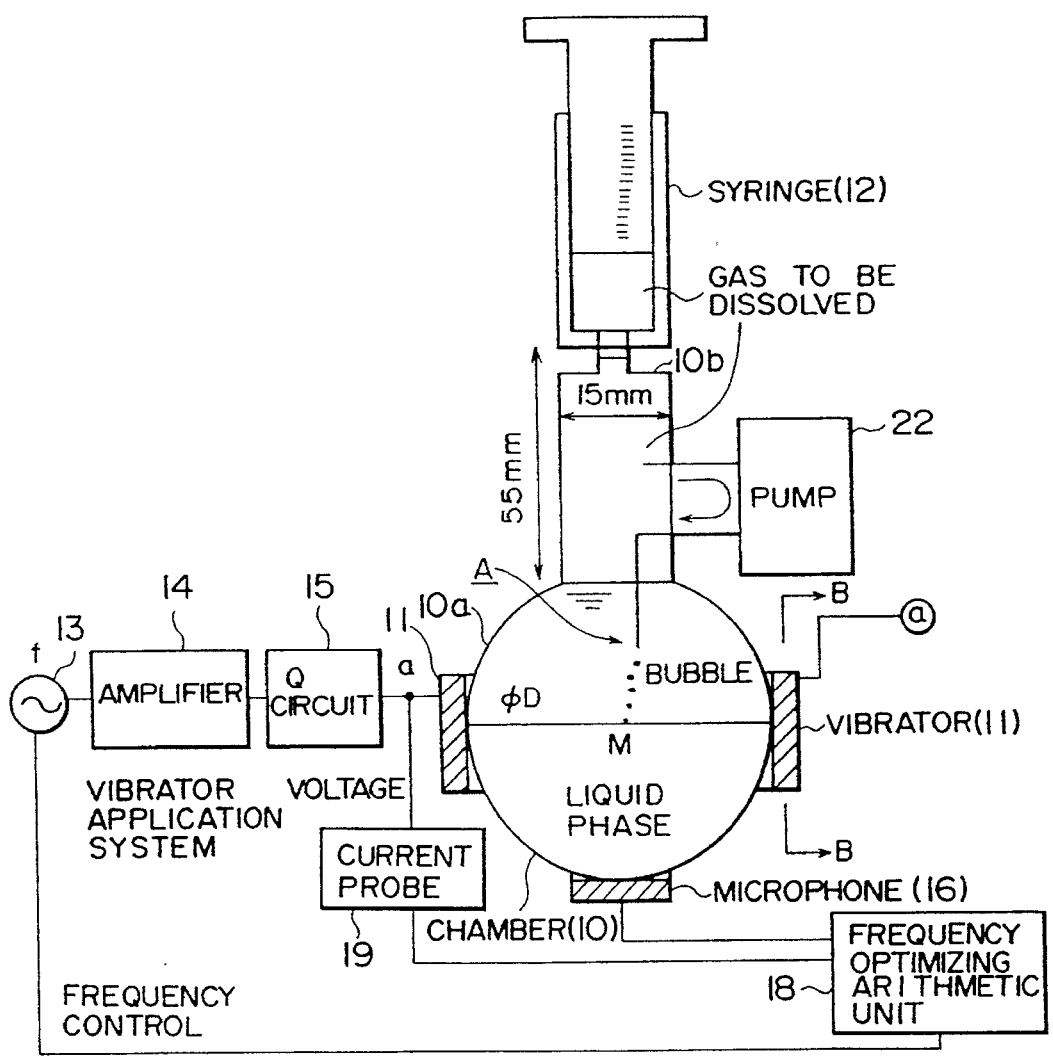
FIG. 10A is a diagrammatic side sectional view illustrating a liquid treating apparatus according to yet another embodiment of the present invention.
Figure 10B:
FIG. 10B is an enlarged view of a small tube.
Figure 10C:
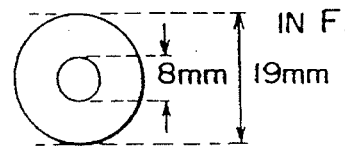
FIG. 10C is a side view of a vibrator.

FIG. 10A is a diagrammatic side sectional view of a liquid treating apparatus according to yet another embodiment of the present invention. FIG. 10B is an enlarged view of "A" (small tube) in FIG. 10A while FIG. 10C is an enlarged view of a vibrator (e.g., piezoelectric vibrator).

Referring to FIG. 10A, the liquid treating apparatus of this embodiment comprises a frequency optimizing arithmetic unit 18 in place of the oscilloscope 17 in FIG. 3A. In addition, a current probe 19 is arranged between the frequency optimizing arithmetic unit 18 and the Q circuit 15 to detect the vibration current supplied from the Q circuit 15 to the vibrators 11. Other components and parts are similar to those described in conjunction with FIGS. 3A through 3C. This apparatus has a feedback function for controlling the vibration frequency of the vibrators 11 to ensure proper resonance conditions by means of monitoring the amplitude by vibration in the chamber 10 as well as the current flowing through the vibrators 11.

When the above mentioned chamber 10 is in the resonance state, the amplitude by vibration becomes maximum while the current flowing through the vibrators 11 becomes minimum. Accordingly, it is possible to keep the resonance condition by means of detecting the amplitude and the current and adjusting them. The aspect illustrated in FIG. 10A can be controlled to keep the resonance condition even if the propagation velocity of the vibration wave through the liquid phase is changed with temperature of or the amount of the dissolved gas in the liquid phase.

Vibration Wave in Modification

The vibration wave is required to have an amplitude that allows production of oxides around at least the compressed bubbles.

Figure 13:
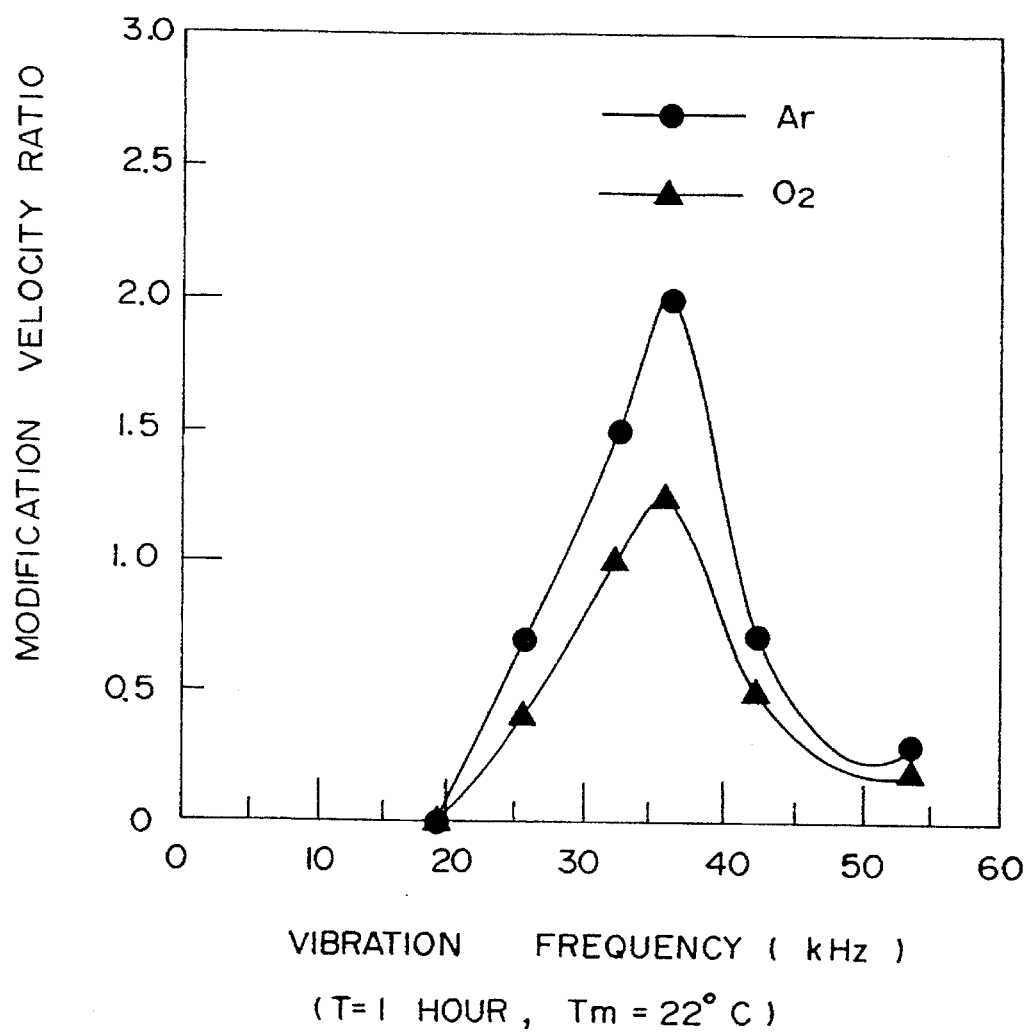
FIG. 13 is a graph illustrating the modification velocity ratio of water as a function of resonance frequency.

FIG. 13 shows the modification rate ratio as a function of a vibration frequency. This ratio is calculated out of the results illustrated in FIG. 12 by using the above mentioned equation (2). As a result, it has been revealed that the vibration frequency is in a range preferably from 25 kHz to 55 kHz, and more preferably from 30 kHz to 40 kHz.

It is preferable to use the resonance phenomenon of the vibration wave by the efficiency considerations on the energy required for creating the high-pressure field and the high-temperature field. The term "resonance" used herein means a phenomenon that the amplitude of the vibrating system increases rapidly when frequencies of a cyclic external force become close to a natural frequency of that vibrating system.

In this event, the amplitude by vibration in the chamber 10 may also be monitored based on the detected voltage supplied from a detector such as a microphone 16 or a piezoelectric element disposed on the chamber 10. The maximum voltage level is obtained from the detector and the smallest current is supplied to the vibrators 11 when the chamber 10 is in the optimum resonance condition.

Figure 14:
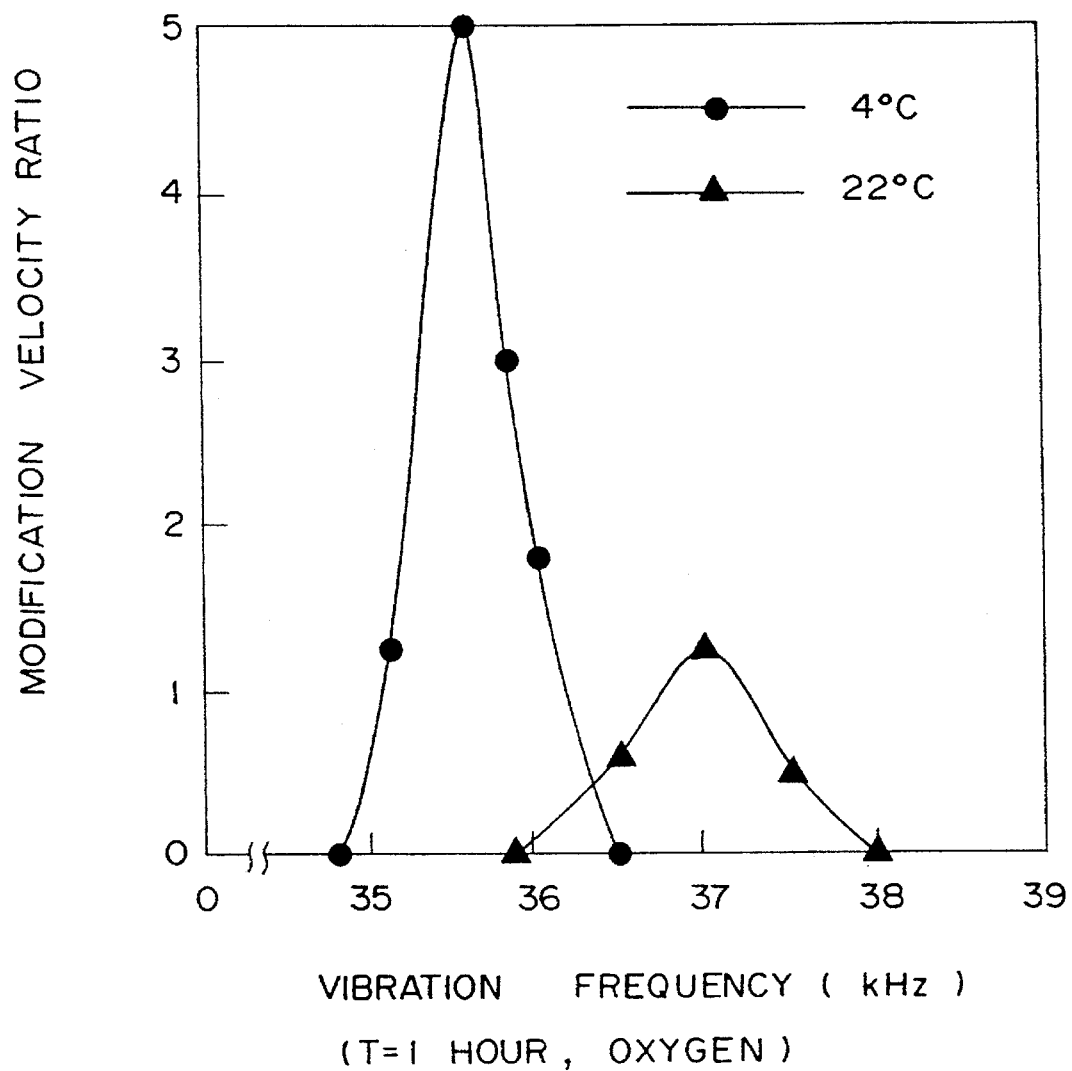
FIG. 14 is a graph illustrating the modification velocity ratio of water as a function of a vibration frequency.

FIG. 14 shows the modification velocity ratio as a function of the vibration frequency obtained under the condition of D: 5 cm, oxygen introduction, T: 1 hour, and 22° C. This result shows experimentally that to use the resonance of the chamber is effective because the modification velocity ratio becomes high at a region where the chamber is resonated.

Treatment Temperature in Modification

Figure 15:
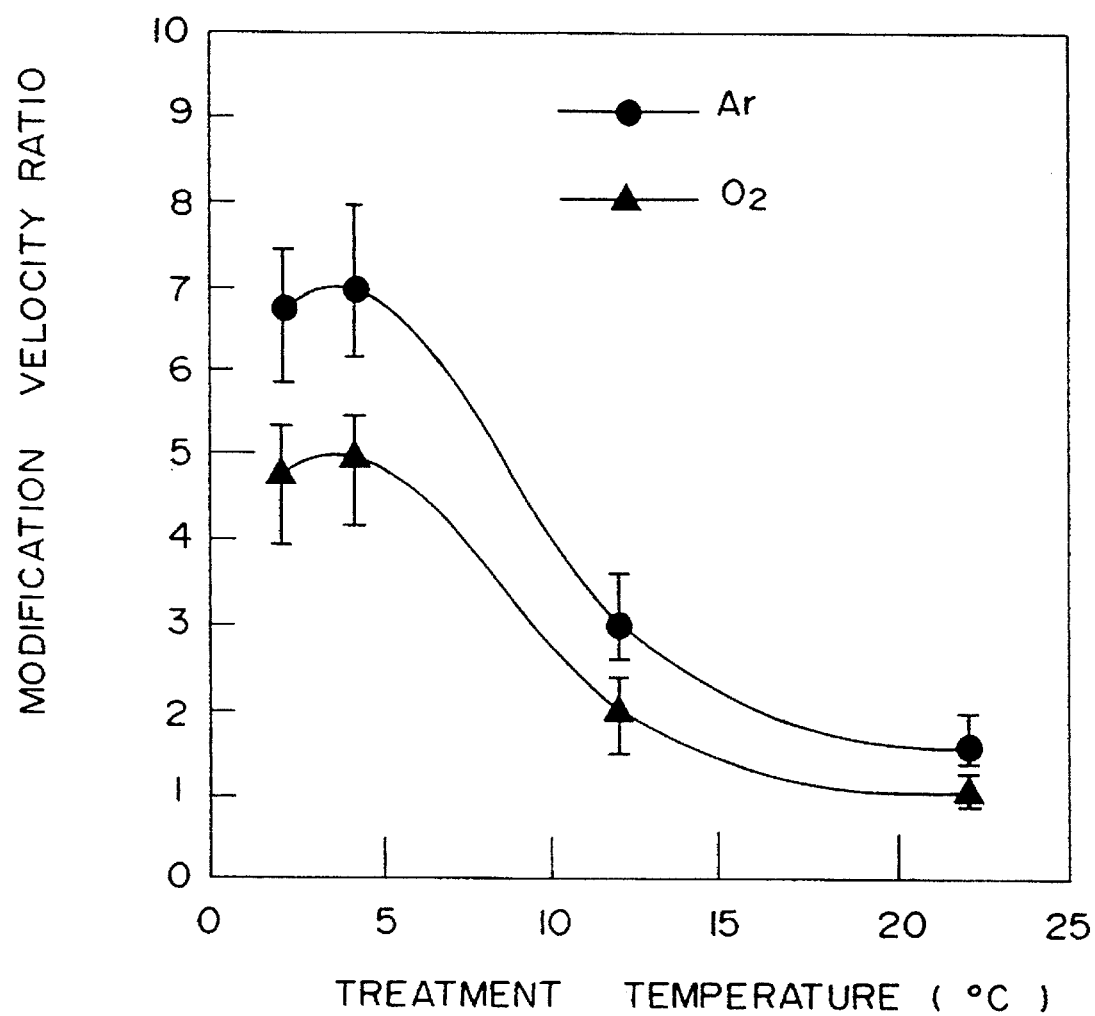
FIG. 15 is a graph illustrating the modification velocity ratio of water as a function of a treatment temperature.

FIG. 15 shows the modification velocity ratio as a function of a treatment temperature. As apparent from the figure, the modification velocity ratio becomes maximum at the treatment temperature of Tm=4° C. The higher the temperature, the lower the modification velocity ratio. With this respect, it is preferably to set the treatment temperature in a range from 0° C. to 4° C., and it is optimum that the treatment temperature is set to 4° C.

Treatment Time in Modification

Figure 16:
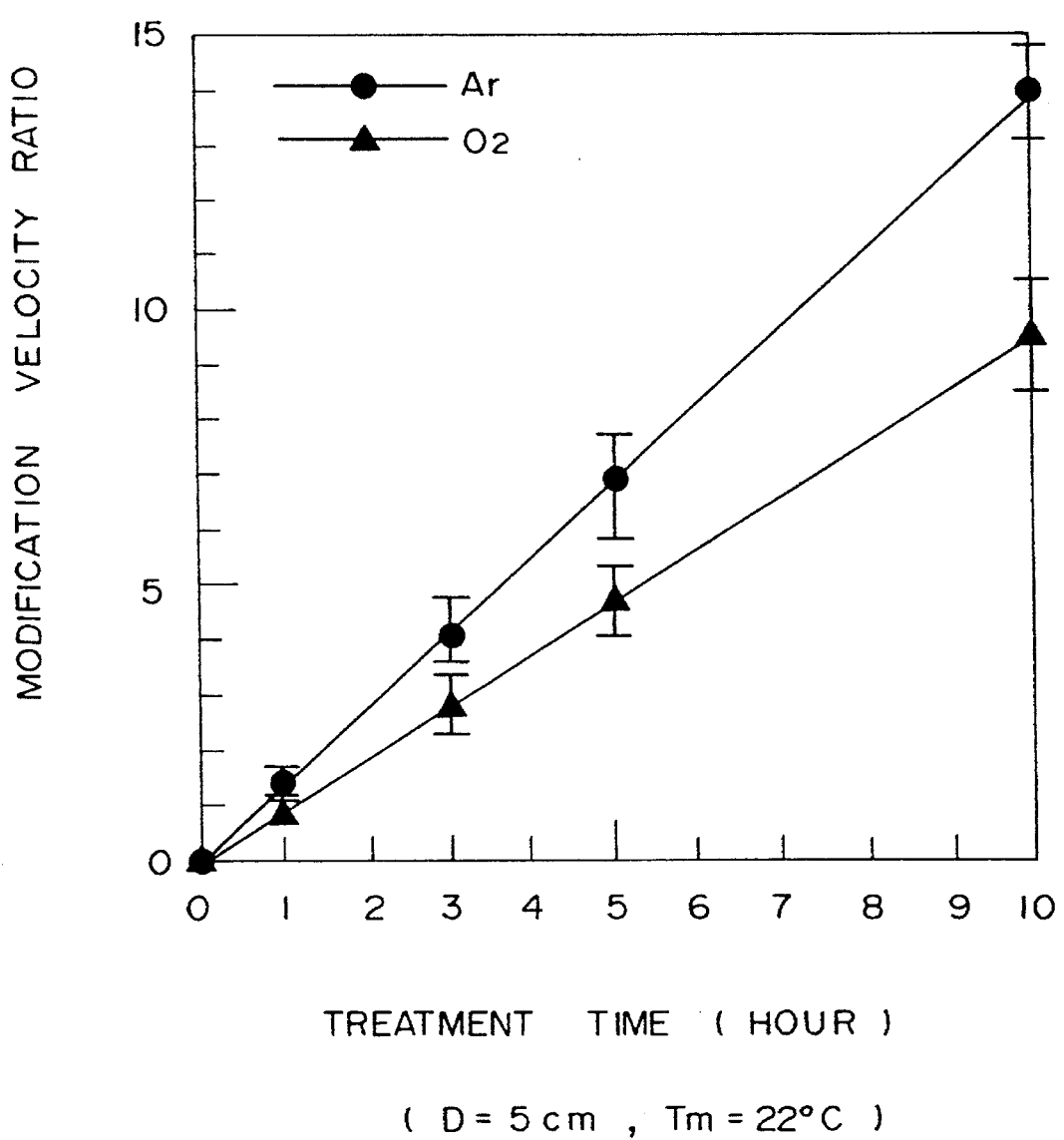
FIG. 16 is a graph illustrating the modification velocity ratio of water as a function of a treatment time.

FIG. 16 shows change in amount of the modified liquid as a function of a treatment time. It is revealed that the amount is in proportion to the treatment time. The longer time the water is treated, the more the water contains activated chemical species.

Liquid Treating Apparatus for Liquid Modification

Figure 17A:
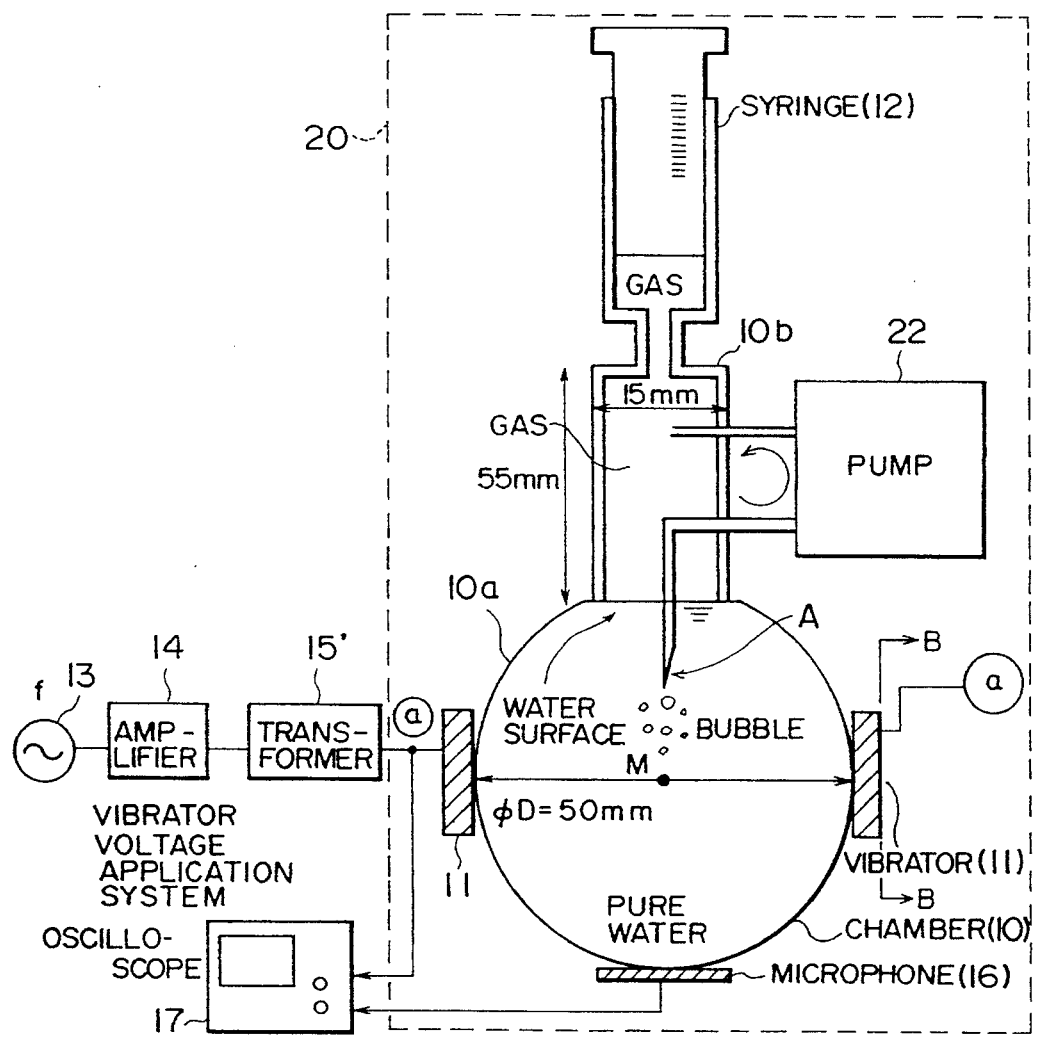
FIG. 17A is a diagrammatic side sectional view illustrating a liquid treating apparatus for liquid modification according to an embodiment of the present invention.
Figure 17B:
FIG. 17B is an enlarged view of a small tube.
Figure 17C:
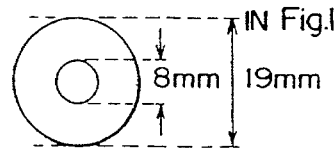
FIG. 17C is a side view of a vibrator.

FIG. 17A shows a liquid modification apparatus according to an embodiment of the present invention. FIG. 17B is an enlarged view of "A" (small tube) in FIG. 17A while FIG. 17C is an enlarged view of a vibrator (e.g., piezoelectric vibrator).

Referring to FIG. 17A, this apparatus comprises a chamber 10, vibrators 11, a small tube (bubble forming means), and a chamber cooling apparatus 20 (temperature controller). The chamber 10 comprises a liquid containing unit 10a and a gas filling unit 10b, which is for holding or storing aqueous liquid (particularly water) in. The vibrators 11 are disposed oppositely on the sides of the chamber 10 for use in applying the vibration waves to the liquid. The small tube is used for forming bubbles in the liquid. The chamber cooling apparatus 20 is for use in keeping the entire assembly of the water treating unit at a constant low temperature.

Figure 18:
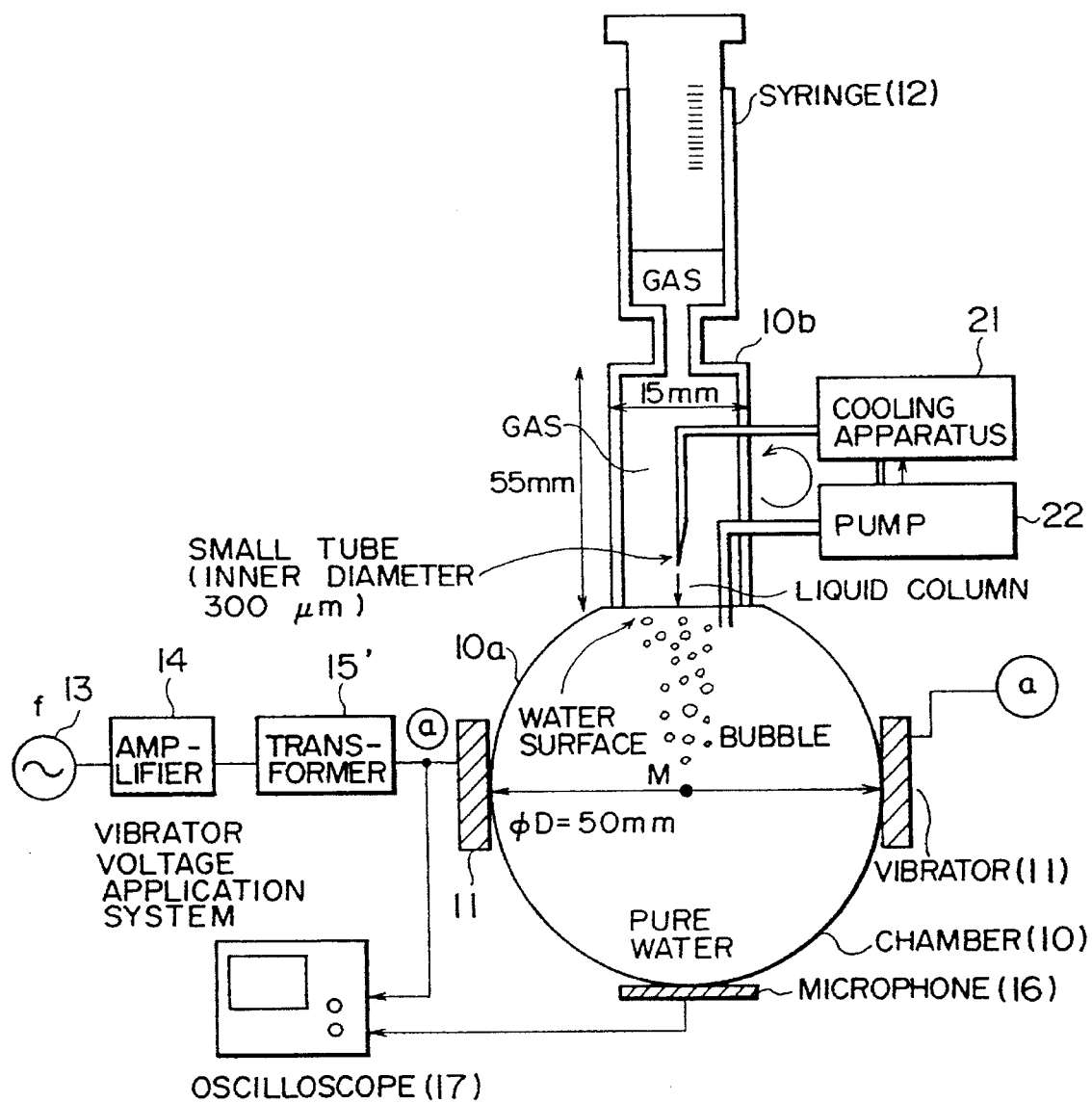
FIG. 18 is a diagrammatic side sectional view illustrating a liquid treating apparatus for liquid modification according to another embodiment of the present invention.

The bubbles may be introduced into the liquid by any one of adequate methods such as by releasing them into the liquid through a small tube or a gas diffusion pipe. However, it is preferable to use a method in which a liquid is sucked up through a pump 22 and is released out of the small tube "A" as shown in FIG. 18, from the point of preventing the ordinary wave from being disturbed greatly and allowing easy formation of smaller bubbles. In this event, the liquid may be supplied either as a continuous liquid column or as intermittent drops.

Figure 19:
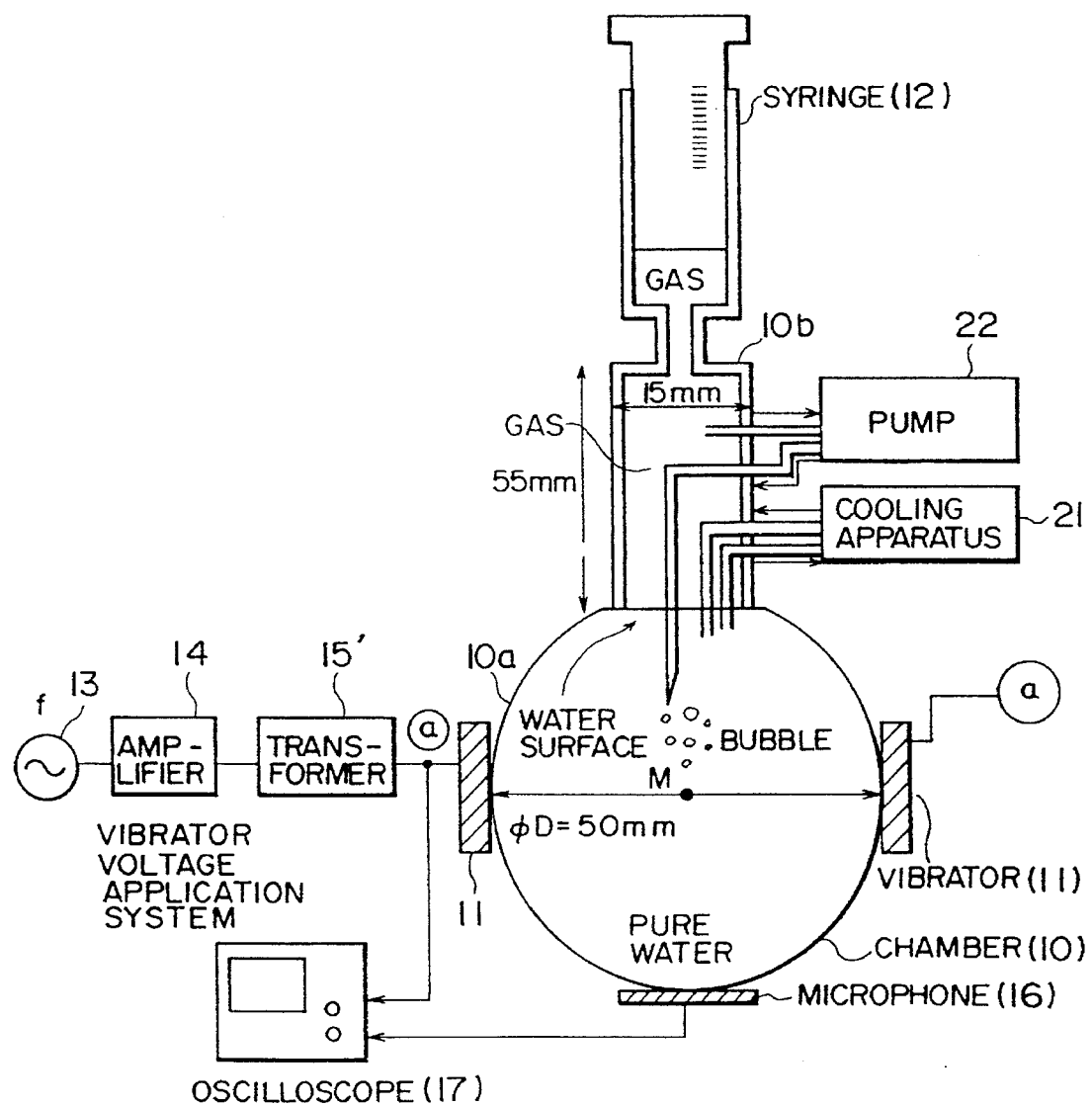
FIG. 19 is a diagrammatic side sectional view illustrating a liquid treating apparatus for liquid modification according to yet another embodiment of the present invention.

The treated water may be cooled by any one of adequate methods. For example, the entire assembly of a water cooling unit 21 may be cooled as shown in FIG. 18. Alternatively, the treated water may be circulated through a pump 22 to cool only the water as shown in FIG. 19. Further, a circulated water for use in introducing the bubbles may be cooled as shown in FIG. 18.

In FIG. 17A, only a single pair (two) of the vibrators 11 are disposed on both sides of the chamber 10, symmetrically with respect to the center thereof. The vibrators 11 are connected to oscillator 13 through an amplifier 14 and a transformer 15'. The oscillator 13 supplies a current to the amplifier 14. The amplifier 14 amplifies the current, while the transformer 15' enhances the voltage thereof to produce a vibration current. The vibration current is then supplied to the vibrators 11. A microphone 16 serving as vibration wave detecting means is disposed on the bottom of the chamber 10. The waveforms of the vibration wave detected by the microphone 16 are monitored by an oscilloscope 17. The oscilloscope 17 also monitors the waveforms of the vibration current supplied from the transformer 15' to the vibrators 11.

In the apparatus illustrated in FIG. 17A, a strong vibration wave can be generated in the chamber 10 by means of resonation of the vibration waves when the vibrators 11 are operated at the resonance frequency f (f=V/D) determined according to the chamber diameter D and the propagation velocity V of the vibration wave in water. The strong vibration wave causes the bubbles to be sucked into the center of the sphere. Accordingly, it is possible to improve a water quality effectively by using the high-temperature field and the high-pressure field generated as a result of the bubble compression at or around the center of the sphere.

Figure 20:
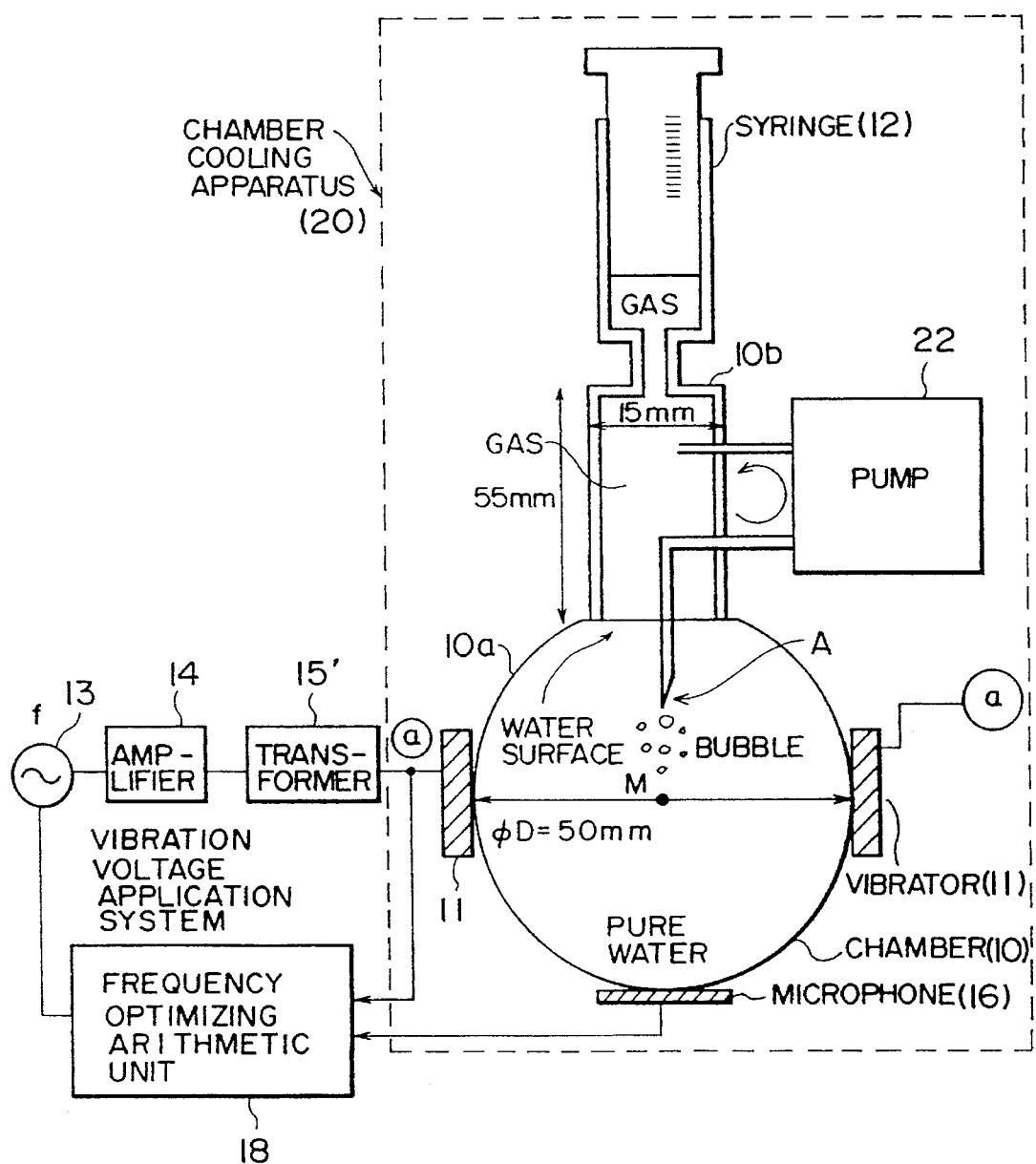
FIG. 20 is a diagrammatic side sectional view illustrating a liquid treating apparatus for liquid modification according to further embodiment of the present invention.

Referring to FIG. 20, the liquid treating apparatus of this embodiment comprises a frequency optimizing arithmetic unit in place of the oscilloscope 17 in FIG. 17A. In addition, a current probe (not shown in FIG. 20) is arranged between the vibrator 11 and the transformer 15' to detect the vibration current supplied from the transformer 15' to the vibrators 11. Other components and parts are similar to those described in conjunction with FIG. 17A. This apparatus has a feedback function for controlling the vibration frequency of the vibrators to ensure proper resonance conditions by means of monitoring the amplitude by vibration in the chamber 10 detected by the microphone 16 as well as the current flowing through the vibrators 11.

The amplitude by vibration in the chamber 10 detected by the microphone 16 becomes maximum while the current flowing through the vibrators 11 becomes minimum when the above mentioned chamber 10 is in the resonance state. Accordingly, it is possible to keep the resonance condition by means of detecting the amplitude and the current and adjusting them.

With the structure illustrated in FIG. 20, the resonance condition can be kept even when the propagation velocity of the vibration wave is changed with temperature of the liquid.

The resonance condition may also be kept through, for example, the following alternating methods. First, the vibration waves are generated simultaneously by the opposing vibrators to maintain the resonance condition. Second, the vibration wave is generated by either one of the vibrators. The incoming vibration wave is detected by the other vibrator, following which a driving voltage is applied to the vibrator as soon as possible that has received the vibration wave. Of course, the latter method is also available to maintain the resonance condition.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The present invention will be described more in detail below with reference to the drawing.

EMBODIMENT I-1

A gas dissolution test was conducted with the liquid treating apparatus illustrated in FIG. 3A. Referring to FIG. 3A, the chamber 10 comprises a gas filling unit 10b and a liquid containing unit 10a, which liquid containing unit 10a is made of glass and is formed into a sphere with outer and inner diameters of 40 mm and 38 mm, respectively. A single pair (two) of the vibrators 11 are disposed on both sides of the chamber 10, symmetrically with respect to the center thereof.

Pure water containing no dissolved gas was charged in the above mentioned chamber 10. A gas was released into the pure water out of a small tube (having an inner diameter of 500 μm) by using a circulation pump. A volume of the dissolved gas was measured according to the scale on the syringe containing the gas. The vibrators 11 driving voltage was applied from the oscillator 13 to these two vibrators 11 through the amplifier 14 (180 W) and the Q circuit 15. With the vibrator driving voltage of 300 $V_{p\text{-}p}$, an output voltage of the oscillator 13 was 2 $V_{p\text{-}p}$ while an output voltage of the amplifier 14 was 60 $V_{p\text{-}p}$.

The vibrators 11 were driven in the apparatus illustrated in FIG. 3A at the resonance frequency of f (f=V/D) determined according to the diameter D of the chamber 10 and the propagation velocity V of the vibration wave in the water. A strong vibration wave was produced in the chamber 10, and the bubbles floated up out of the end of the small tube were sucked into the center of the liquid containing unit 10a, with being reduced in dimension. The small tube was vibrated as the chamber resonated, allowing formation of smaller bubbles than usual (where no resonance is caused) in the liquid phase. The bubbles received a high compression pressure at the center of the liquid containing Unit 10a because the vibration waves transmitted from the inner wall of the liquid containing unit 10 were superposed locally. Accordingly, the bubbles were dissolved at a high rate. Since the bubbles were sucked into the center of the liquid containing unit 10, the content of the chamber was agitated or stirred. As a result, the density of the dissolved gas in the entire liquid became uniform.

FIG. 4 is a graph illustrating a solubility of argon to water. The following three dissolution methods were used for the test: the present method, the bubbling (with the bubble diameter of 1 mm), and the ultrasonic wave irradiation (disclosed in Japanese Patent Laid Open No. 61-227824 by using an ultrasonic wave washer, B-72J available from BRANSON Co.). For the above mentioned ultrasonic wave irradiation, the test was conducted with the power density of 0.24 $W/cm^2$ that were smaller than the power density of 0.33 $W/cm^2$ or higher disclosed in the above mentioned publication.

To compare the solubility in the individual dissolution methods, the solution velocity of the gas was assessed according to "a period required that 95% of the saturated solubility was dissolved into the liquid phase". For water, V=1500 m/s and the spherical chamber was resonated at the vibration frequency of f=39.5 kHz (f=1,500,000 mm/38 mm=39.47 kHz=39.5 kHz) since the chamber had the inner diameter of 38 mm.

As shown in FIG. 5, the solution velocities were 2.5 minutes, 13 minutes, and 20 minutes for the present method, the bubbling, and the ultrasonic wave irradiation, respectively. With bubbling, it was easy to dissolve approximately half the saturated solubility for a relatively short period of time. It required, however, much time to exceed this amount. On the contrary, the present dissolution method provided a solution velocity of eight times as high as that in the bubbling, permitting the gas to be dissolved in up to the saturated solubility for a remarkably short period of time.

In addition, the present dissolution method provided a solution velocity of approximately five times as high as that in the ultrasonic wave irradiation described above with less energy introduced (approximately 1/10 of the ultrasonic wave irradiation method).

Subsequently, the solubility characteristics of carbon dioxide (25.9 times as high the saturated solubility as argon) that is higher in solubility than argon were measured in the same manner as those described above. The results are given in FIG. 5.

As apparent from FIG. 5, the present method was slightly superior in solution velocity to the bubbling. However, a gas releasing effect was observed after a certain amount of the gas was dissolved into the liquid phase. The gas solubility had an upper limit, i.e., approximately 88% of the saturated solubility. With the method according to the present invention, less or no significant difference in solution velocity tends to be obtained for a gas having a large saturated solubility, as compared with oxygen or argon. The gas solubility may be smaller than the saturated solubility when the amplitude of the vibration wave is too large than necessary. If it is difficult to dissolve the gas up to the saturated solubility, the bubbling method may be used together to dissolve the gas up to the saturated solubility.

The solution velocities of the gases are set forth in Table 1 below.

TABLE 1

GAS SOLUTION VELOCITY TO WATER

| Gas | $O_2$ | Ar | $N_2$ | $CO_2$ | $C_2H_4$ |
|---|---|---|---|---|---|
| (a) Present Method (min.) | 2.5 | 2.5 | 1.0 | 52.0 | 11 |
| (b) Bubbling (min.) | 20.0 | 20.0 | 8.0 | (up to 88%) | 33 |
| (b)/(a) | 8 | 8 | 8 | — | 3 |

NOTE) Solution velocity: time required to reach 95% of saturated solubility.
(b)/(a): Solution velocity ratio As apparent from Table 1, in the method according to this embodiment, the solution velocity was approximately 8 times as large for oxygen, argon, and nitrogen, and approximately three times as large for ethylene as the solution velocity obtained with the bubbling method. The solution velocity for carbon dioxide was approximately equal to that obtained with the bubbling method. These results indicated experimentally that the smaller the gas has a saturated solubility to the liquid phase, the more the solution velocity was improved.

EMBODIMENT I-2

A gas dissolution test was conducted by using the liquid treating apparatus illustrated in FIG. 6A. In this embodiment, a liquid column was knocked against the water surface within the liquid containing unit 10a to form bubbles, thereby introducing them into the liquid phase (liquid column knocking method). The liquid column was 300 μm in diameter, and was knocked at a rate of 80 cm/s. The experiment was conducted at an vibrator driving voltage of 300 $V_{p-p}$ at 22° C.

The results obtained are given in Table 2 below. Sample gases used were oxygen, argon, and nitrogen.

TABLE 2

GAS SOLUTION VELOCITY TO WATER

| Gas Method | $O_2$ | Ar | $N_2$ |
|---|---|---|---|
| (a) Present Method (min.) | 4.0 | 4.0 | 1.5 |
| (b) Liquid Knocking Method (min.) 15.0 | 15.0 | 16.0 | 6.0 |
| (b)/(a) | 3.8 | 4 | 5 |

NOTE) Solution velocity: time required to reach 95% of saturated solubility.
(b)/(a): Solution velocity ratio As apparent from Table 2, a larger number of finer bubbles were formed in the liquid knocking method used in this embodiment than in the bubbling with a small tube. As a result, the solution velocity was larger than in the bubbling. In this Embodiment (I-2), no such effect was obtained that the bubbles became fine due to vibration of the small tube (a nozzle) as in Embodiment I-1. Accordingly, this embodiment was less significant than Embodiment I-1 on the effect of improving the solution velocity. However, the solution velocity was superior by 3–5 times to that in the bubbling method.

Figure 7:
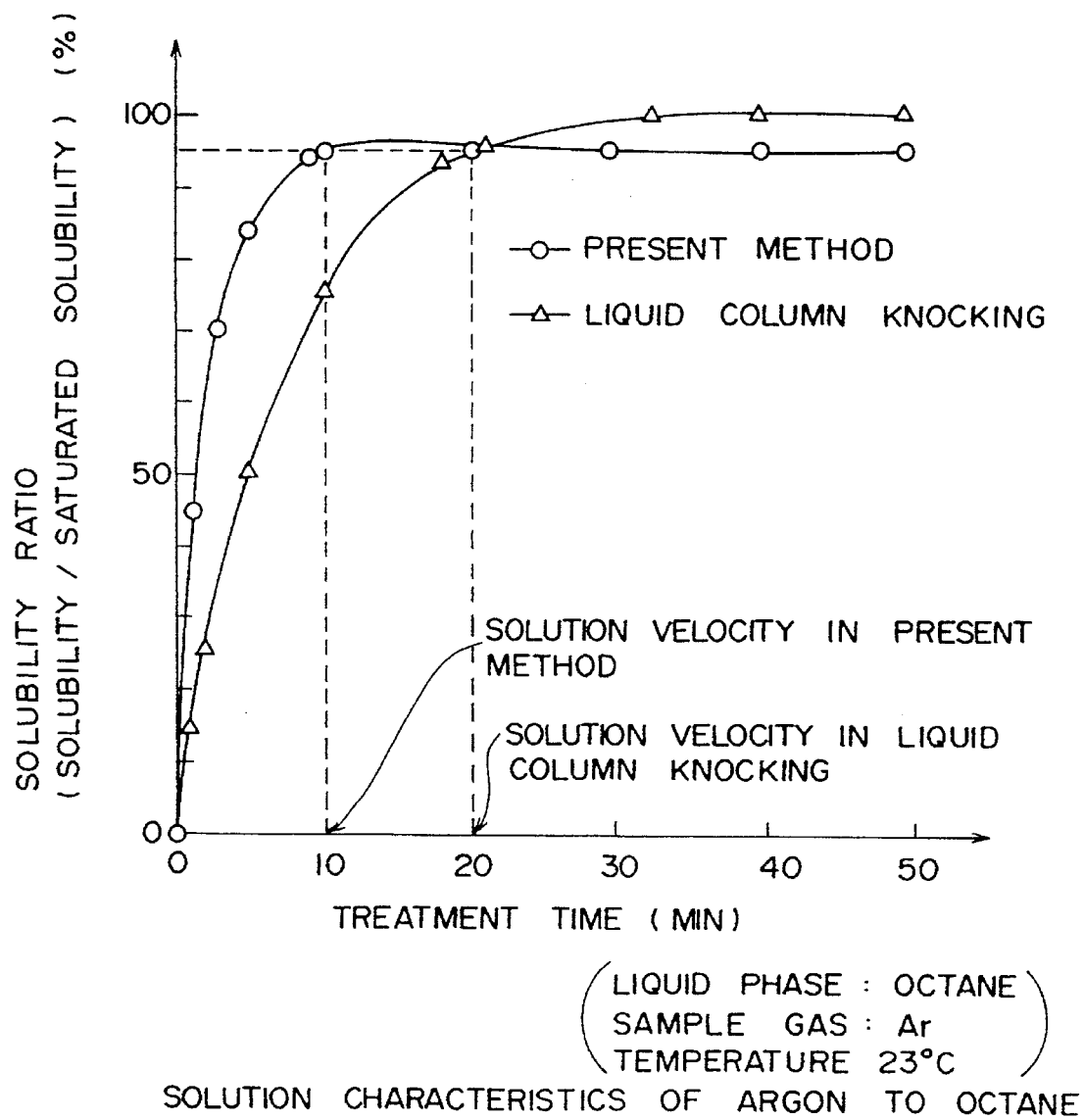
FIG. 7 is a graph illustrating solubility; characteristics of argon to octane (liquid phase) achieved according to Embodiment I-2.

Subsequently, another test was conducted. More specifically, the water was replaced by octane as the liquid phase, into which argon gas was dissolved. At the vibrator driving voltage of 300 $V_{p-p}$, the bubbles were released out of octane. With this respect, the experiment was conducted at the vibrator driving voltage of 200 $V_{p-p}$. FIG. 7 shows a dissolution characteristic of argon to octane obtained in this embodiment. The solution velocities were 10 minutes and 20 minutes with the present method and the liquid column knocking method (without application of the vibration wave to the liquid phase), respectively. The gas solubility had an upper limit, i.e., approximately 95% the saturated solubility with the present embodiment. It is preferable to dissolve the gas up to 95% the saturated solubility by using the present method, following which the liquid column knocking may be used.

Figure 8:
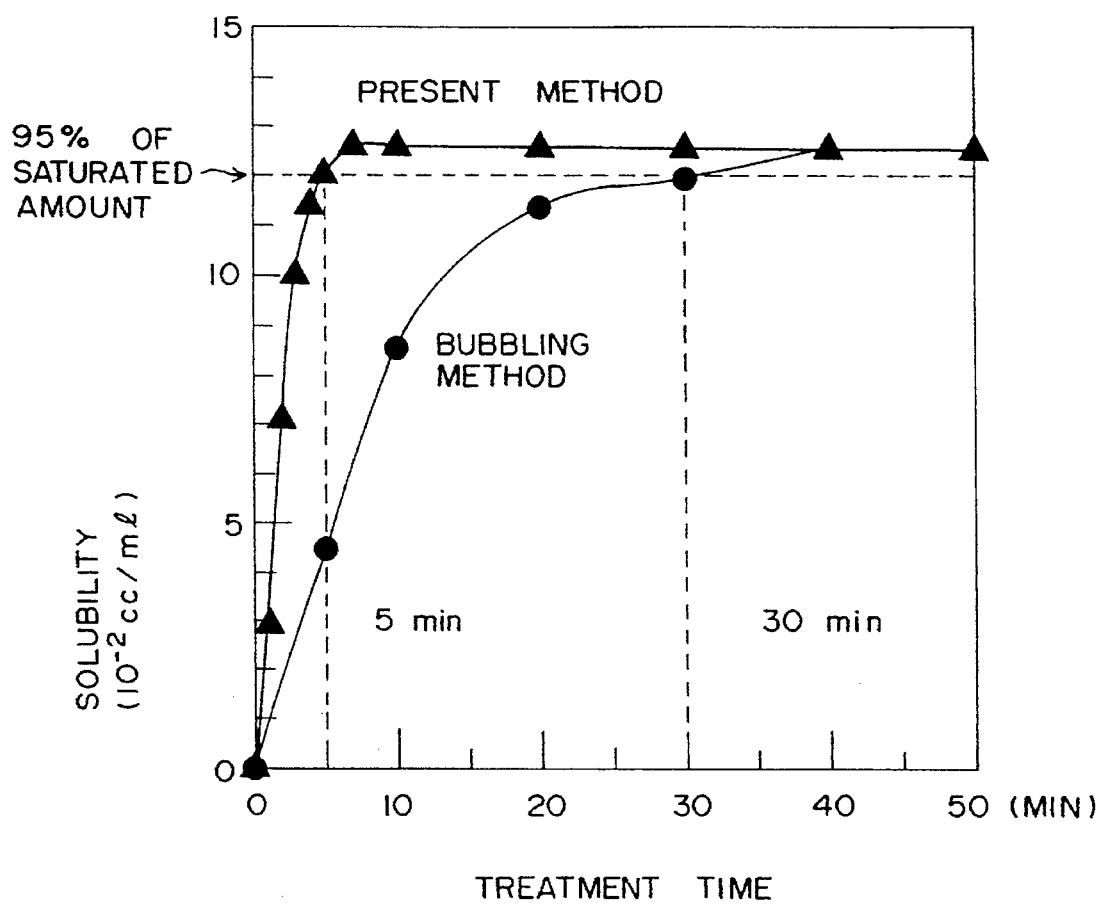
FIG. 8 is a graph illustrating solubility characteristics of oxygen to a light oil.
Figure 9:
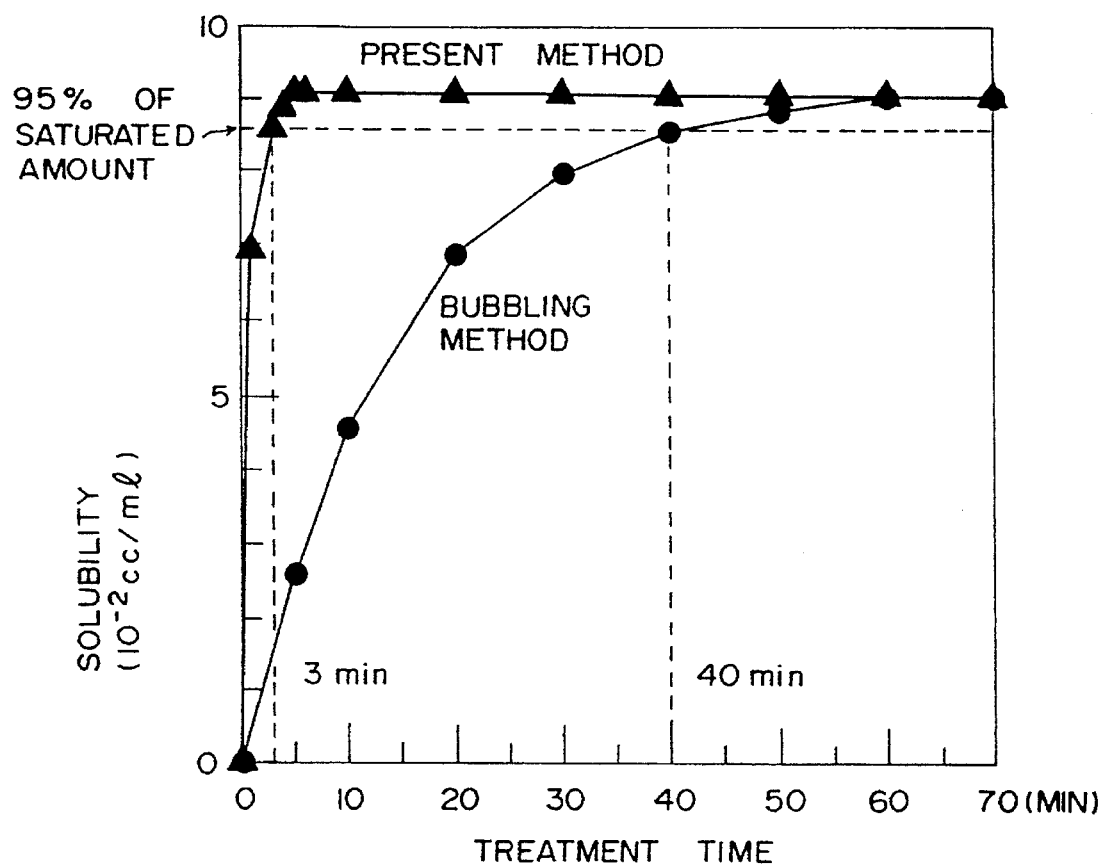
FIG. 9 is a graph illustrating solubility characteristics of oxygen to a heavy oil.

In addition, as an example of dissolving gas into an organic solvent, the dissolution treatment was conducted by using a light oil and a heavy oil. The chamber 10 used for treatment had a diameter D of 4 cm. The gas dissolved was oxygen. The results are given in FIGS. 8 and 9. FIG. 8 shows solution characteristics of oxygen to the light oil, while FIG. 9 shows solution characteristics of oxygen to the heavy oil. With the apparatus according to this embodiment, the solution velocities were six times and thirteen times for the light oil and heavy oil, respectively, as high as those in the bubbling.

The above mentioned results indicated experimentally that the method according to the present invention is well applicable to the organic solvents.

EMBODIMENT I-3

A gas dissolution test was conducted with the liquid treating apparatus illustrated in FIG. 10A. The liquid treating apparatus of this embodiment comprises a frequency optimizing arithmetic unit 18 in place of the oscilloscope 17 in FIG. 3A. In addition, a current probe 19 is arranged between the frequency optimizing arithmetic unit 18 and the Q circuit 15 to detect the vibration current supplied from the Q circuit 15 to the vibrators 11. Other components and parts are similar to these described in conjunction with FIGS. 3A through 3C. This apparatus has a feedback function for controlling the vibration frequency of the vibrators 11 to ensure proper resonance conditions by means of monitoring the amplitude by vibration in the chamber 10 as well as the current flowing through the vibrators 11.

The test was conducted by using the above mentioned liquid treating apparatus illustrated in FIG. 10A. The amplitude by vibration of the chamber 10 was increased when the chamber 10 was in the resonance state. The maximum amplitude by vibration was obtained in the chamber 10 and the smallest current was supplied to the vibrators 11 when the chamber 10 was in the resonance state. Accordingly, it was possible to keep the resonance condition by means of detecting the amplitude and the current and adjusting them. In this embodiment, it was possible to keep the resonance condition even if the propagation velocity of the vibration wave through the liquid phase is changed with temperature of or the amount of the dissolved gas in the liquid phase.

As mentioned above, the liquid treating method and the liquid treating apparatus according to the present invention allowed the gas dissolved into the liquid up to the saturated solubility for a shorter period of time as compared with conventional ones.

EMBODIMENT II-1 (LIQUID MODIFICATION)

A gas dissolution test was conducted with the liquid treating apparatus illustrated in FIG. 17A.

The chamber 10 comprises a liquid containing unit 10a and a gas filling unit 10b, which chamber 10 is made of quartz and is formed into a sphere with outer and inner diameters of 54 mm and 50 mm, respectively. A single pair (two) of the vibrators 11 were disposed on both sides of the chamber 10, symmetrically with respect to the center thereof.

Pure water containing no dissolved gas was charged in the above mentioned chamber. A gas was released into the pure water out of a small tube (having an inner diameter of 500 µm). with the vibrator 11 driving voltage of 1500 $V_{p-p}$, an output voltage of the oscillator 13 was 3.2 $V_{p-p}$ while an output voltage of the amplifier 14 was 120 $V_{p-p}$. The temperature of the treated water was controlled from outside the chamber 10.

A strong vibration wave was generated in the chamber 10 when the vibrators 11 were operated at the resonance frequency f (f=V/D) determined according to the chamber diameter D and the propagation velocity V of the vibration wave in the water. The strong vibration wave caused the bubbles to be sucked into the center of the liquid containing unit 10a shaped in the sphere. Continuous introduction of the bubbles allowed constant formation of a strong vibration wave field where the bubbles are trapped. In addition, it is possible in this apparatus to adjust a ratio of the modified water(the water improving the liquid quality) in the chamber 10 by increasing or decreasing the treatment time.

EMBODIMENT II-2 (LIQUID MODIFICATION)

FIG. 18 shows another configuration of the liquid treating apparatus. This apparatus is similar to the one illustrated in FIG. 17A except that a liquid column was knocked against the liquid surface of the water within the liquid containing unit 10a, which water is circulated by a pump to form bubbles, and that a temperature of the treated water was controlled by means of controlling the temperature of the circulated water. Such liquid column knocking method has advantages of effective cooling achieved and smaller bubbles (fine bubbles) obtained.

EMBODIMENT II-3 (LIQUID MODIFICATION)

FIG. 19 shows yet another configuration of the liquid treating apparatus. This apparatus is similar to the one illustrated in FIG. 17A except that the treated water was circulated through the cooling apparatus 21 with the purpose of the temperature controlling. This apparatus has an advantage of a higher cooling efficiency over the apparatus illustrated in FIG. 17A.

EMBODIMENT II-4 (LIQUID MODIFICATION)

FIG. 20 shows yet another configuration of the liquid treating apparatus. The liquid treating apparatus of this embodiment comprises a frequency optimizing arithmetic unit 18 in place of the oscilloscope 17 in FIG. 17A. In addition, a current probe 19 is arranged between the vibrators 11 and the transformer 15' to detect the vibration current supplied from the transformer 15' to the vibrators 11. Other components and parts are similar to these described in conjunction with FIG. 17A.

This apparatus has a feedback function for controlling the vibration frequency of the vibrators 11 to ensure proper resonance conditions by means of monitoring the amplitude by vibration in the chamber 10 detected by the microphone 16 as well as the current flowing through the vibrators 11.

Tests with this liquid treating apparatus showed that the maximum voltage level was obtained from the microphone 16 and the smallest current was supplied to the vibrators 11 when the chamber 10 was in the resonance condition.

It was possible to maintain the resonance condition of the chamber 10 by means of detecting the amplitude by vibration in the chamber 10 and the current flowing through the vibrators 11 to adjust them by using the frequency optimizing arithmetic unit 18. It was possible to keep the resonance condition even if the propagation velocity of the vibration wave through the liquid phase is changed with temperature of or the amount of the dissolved gas in the liquid phase.

EMBODIMENT II-5

Figure 21B:
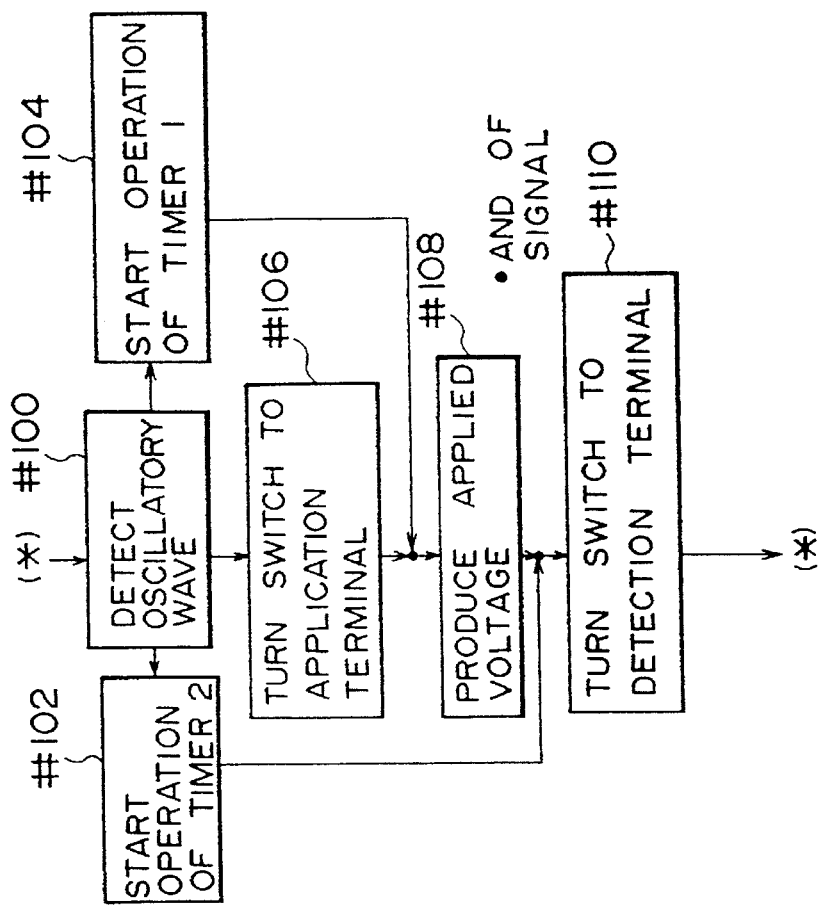
FIG. 21B is a flow chart of an operational flow carried out by the controller in FIG. 21A.
Figure 21A:
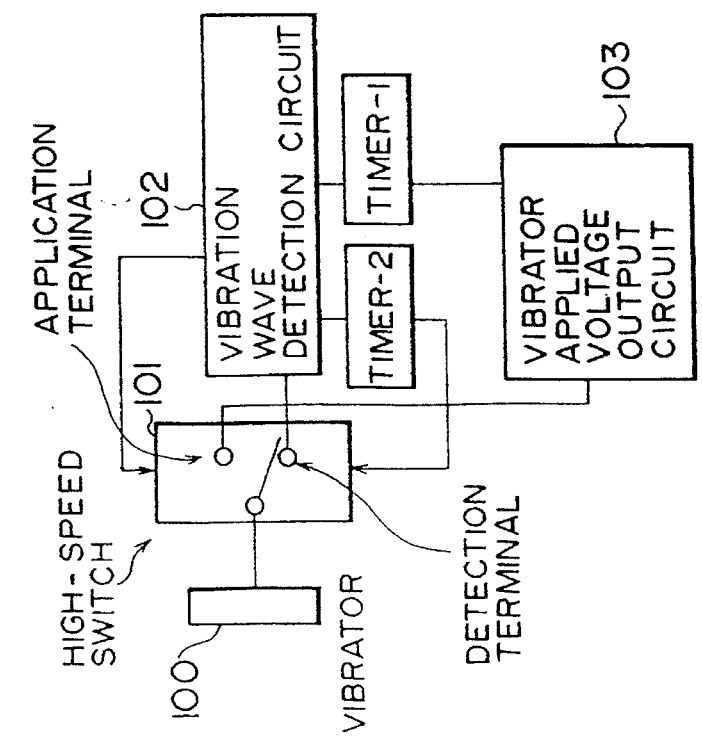
FIG. 21A is a block diagram of a controller for use in maintaining the resonance condition.

FIGS. 21A and 21B show an exemplified method of keeping the resonance condition. FIG. 21A shows a structure of the apparatus while FIG. 21B shows a schematic step of the operation carried out by the apparatus.

A controller illustrated in FIG. 21A comprises a high-speed switch 101 connected to either the vibrator 100. The high-speed switch 101 has a detection circuit for detecting the vibration waves and an application circuit for applying the vibration wave. The vibrator 100 produces a voltage in response to reception of the vibration wave. This voltage is detected by the vibration wave detector 102. The high-speed switch 101 is connected to an applied voltage output circuit 103. The applied voltage output circuit 103 applies the driving voltage to the vibrator 100. In addition, the controller comprises timers 1 and 2. The timers are used to turn the switch between the detection circuit and the application circuit over a short period to produce the vibration waves.

A controlling operation is described now.

With the high-speed switch 101 connected to the detection circuit, the opposing vibrator is forced to generate an vibration wave. This vibration wave is detected through the vibrator 100 by the vibration wave detector 102 (#100). The timers 1 and 2 start operation at the timing when the vibration wave is detected (#012, #104). At the same time, the vibration wave detector 102 supplies a switching signal to the high-speed switch 101. The high-speed switch turns its internal switch to the application circuit in response to this switching signal (#106).

After elapsing the time set in the timer 1, the applied voltage output circuit 103 produces an applied voltage (#108). This output voltage is supplied to the vibrator 100 through the high-speed switch 101. The vibrator 100 produces an vibration wave in response to this output voltage.

After elapsing the time set in the timer 2, the high-speed switch 101 turns its internal switch to the detection circuit in response to the switching signal supplied from the timer 2 (#110). This results in the condition where the incoming vibration wave can be detected. The resonance condition can be kept by means of repeating the above mentioned control flow.

In this event, the controller connected to the vibrator 100 may be associated with each vibrator to generate the vibration waves simultaneously by these vibrators for the above mentioned control flow. Alternatively as mentioned above, the vibration wave may be generated by either one of the vibrators. The incoming vibration wave may be detected by the other vibrator to initiate the control flow.

EMBODIMENT II-6

Figures 22A, 22B:
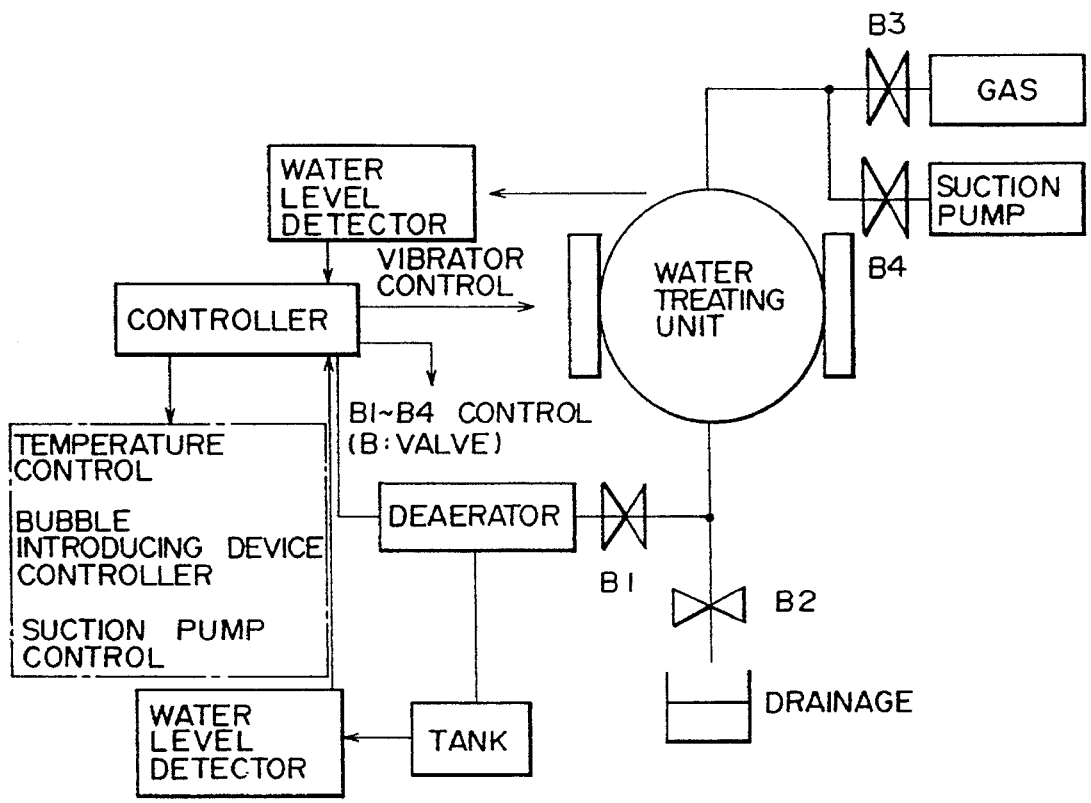
FIG. 22A is a block diagram of a liquid treating apparatus for liquid modification according to another embodiment of the present invention.
FIG. 22B is a process table indicating operational steps carried out by the apparatus in FIG. 22A.

FIG. 22A shows a liquid treating apparatus according to another embodiment of the present invention. This apparatus has a function of automatically introducing deaerated water into the apparatus, that is discharged after modification treatment.

A schematic operation of this apparatus is described with reference to FIGS. 22A and 22B. FIG. 22A shows a structure of the apparatus while FIG. 22B shows a schematic step of the operation carried thereby.

A suction pump is driven with only a valve B4 "opened", the water treating unit is subjected to deaeration in which the modification treatment is to be conducted (step 1). Next, a valve B1 is "opened" (Step 2). This makes the deaerated water in the tank flow into the water treating unit. Subsequently, a water level detector detects that a predetermined volume of water is introduced into the water treating unit. In response to this detection, all valves communicated with the water treating unit (in this embodiment, valves B4 and B1) are "closed" to stop the suction pump (Step 3).

Then, the valve B3 is "opened" to introduce a gas such as oxygen or argon for use in modifying the water. Water modification is conducted by using the resonance of the vibration waves applied by the vibrators (Step 4).

This treatment is continued for a certain period, following which application of the vibration waves is stopped (Step 5). The valve B4 is "opened" to discharge the water improving the liquid water through the valve B2.

This operational flow permits automatic modification of deaerated water. In this embodiment, the liquid treating apparatus comprises a main controller (not shown) to open/close the valves, to drive and control the suction pump, and process, for example, results of the water level detection for the water treating unit and the tank. To control the temperature of the treated water or control the bubble introducing device may be achieved by using any of the above mentioned aspects.

EMBODIMENT II-7 (LIQUID MODIFICATION)

FIG. 23A shows a liquid treating apparatus according to another embodiment of the present invention. This apparatus is similar in structure and operation to the apparatus described in Embodiment II-6 except that it has a function of deaeration in the water treating unit. Accordingly, description of such parts and components are omitted. For the detailed operation, see steps illustrated in FIG. 23B.

EMBODIMENT II-8 (LIQUID MODIFICATION)

Figure 24:
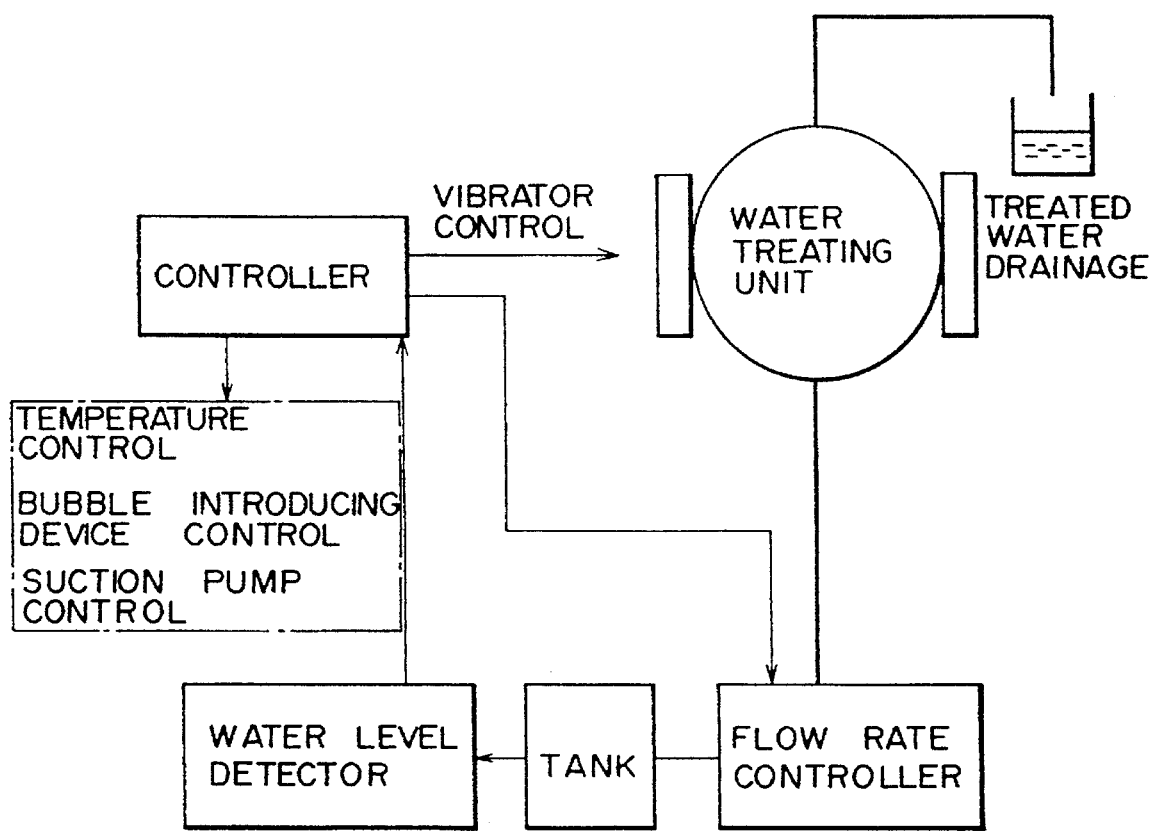
FIG. 24 is a block diagram illustrating a liquid treating apparatus for liquid modification according to further embodiment of the present invention.

FIG. 24 shows a liquid treating apparatus according to yet another embodiment of the present invention. This apparatus is of the type of treating liquid through continuous flow. This apparatus supplies the deaerated water to the water treating unit at a constant flow rate under control by a flow rate controller. The water was subjected to the modification treatment in the water treating unit for a predetermined period, following which the modified water is discharged. See the above mentioned embodiments for other structure and operation.

As mentioned above, it was possible to modify the water effectively by using the above mentioned modification method and modification apparatus.

Properties of Modified Water

Properties of the water, which was treated by using the apparatus in Embodiment II-1 (using oxygen), were determined. For the purpose of comparison, a pure water saturated with oxygen (water after deaeration of the dissolved gas and saturated with was used considering effects of the dissolved gas. The water used was a superpose water (specific resistance: 18 MΩ·cm).

Property 1: Effect on Lactobacillus Growth

A mixture of water (5 cc) and milk (15 cc) was placed in a Petri dish of 9 cm in diameter. Yogurt (3 cc) was dropped at the center thereof, which the yogurt spread to a circle of 2.0–2.1 cm in diameter. Considering that the diameter of the yogurt would be increased, the content of the Petri dish was stood at that state to observe the growth of the yogurt. Modification of water was conducted under the conditions: treatment time T=1 hour, gas used; $O_2$, vibrator driving voltage; V=800 $V_{p-p}$, and chamber inner diameter; D=5 cm.

Figure 25:
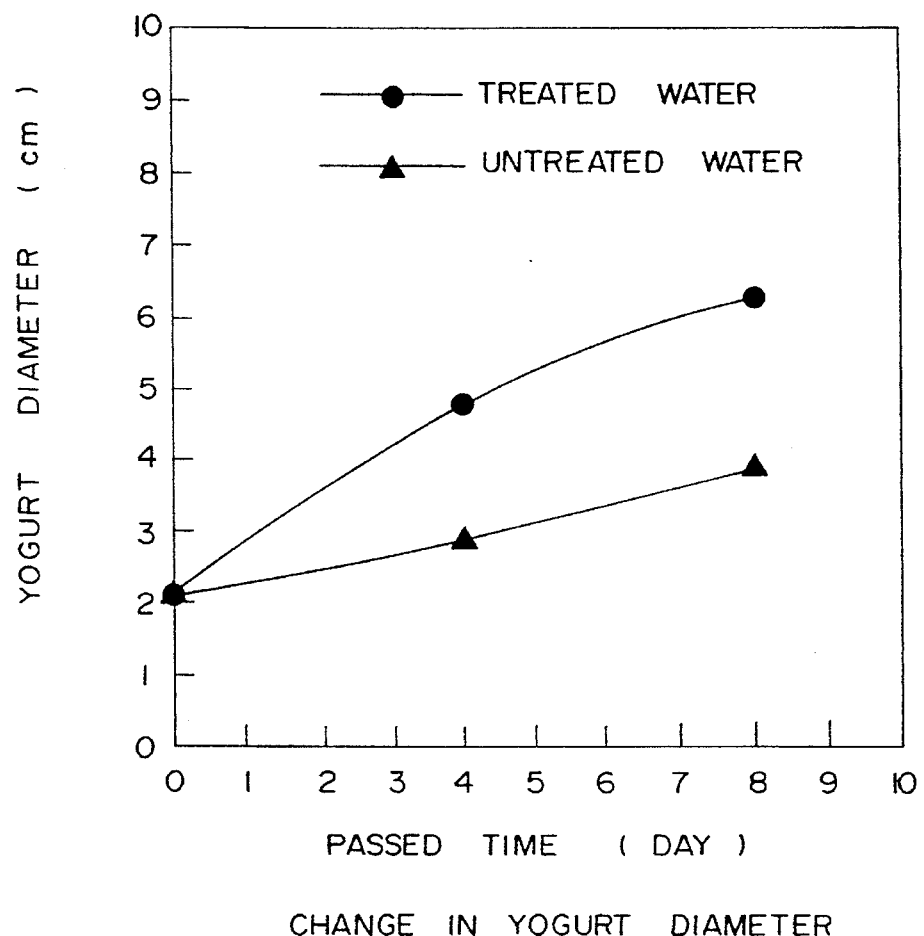
FIG. 25 is a graph illustrating a change with time of a diameter of a drop of yogurt.
Figure 26:
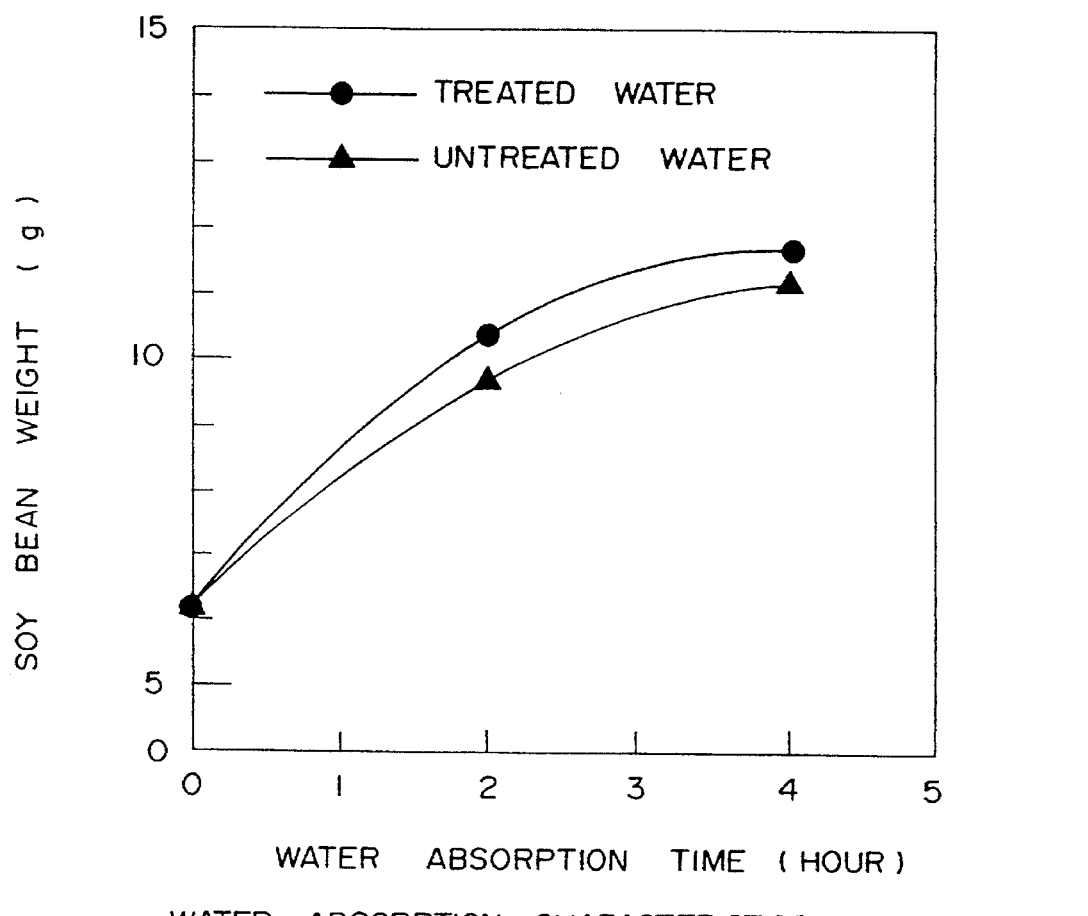
FIG. 26 is a graph illustrating absorption characteristics of soy beans.

The results are given in FIG. 25. These results revealed that Lactobacillus grows actively with the modified water mixed.

Property 2: Effect on Absorption of Soy Beans

Soy beans were dipped overnight in water, and absorptivity was determined according to change in weight of the soy beans. In this test, fifteen soy beans (6.2 g) were used, which were of approximately uniform size. Modification of water was conducted under the conditions: treatment time T=1 hour, gas used; $O_2$, vibrator driving voltage; V=800 $V_{p-p}$, and chamber inner diameter; D=5 cm. The results are given in FIG. 25. These results revealed that the modified water was absorbed more.

Property 3: Effect on Growth of Soy Beans

Vermiculite of 60 g was placed in a container of 170× 170×30 mm and was allowed to absorb water (200 g), on which thirty soy beans were placed. The container was stood in a dark room at 25° C. except for when picked up to absorb water (100 g) after 7 days. The growth rate of the soy beans on each water was determined according to "length" and "thickness" after 10 days. Modification of water was conducted under the conditions: treatment time T=1 hour, gas used; $O_2$, vibrator driving voltage; V=800 $V_{p-p}$, and chamber inner diameter; D=5 cm. The results are given in FIG. 25.

Figure 27:
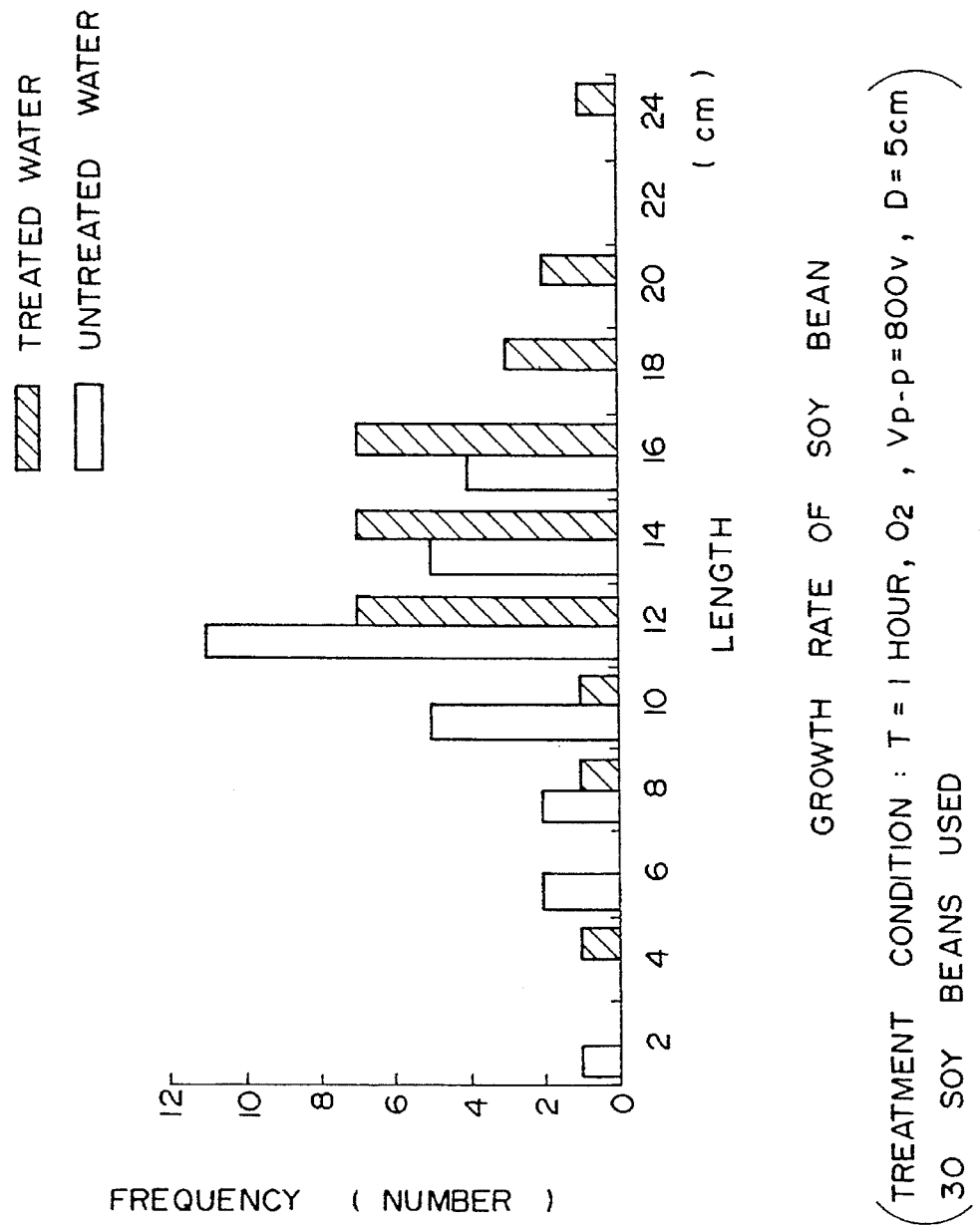
FIG. 27 is a graph illustrating a growth rate of the soy beans as a function of a length of the vein.
Figure 28:
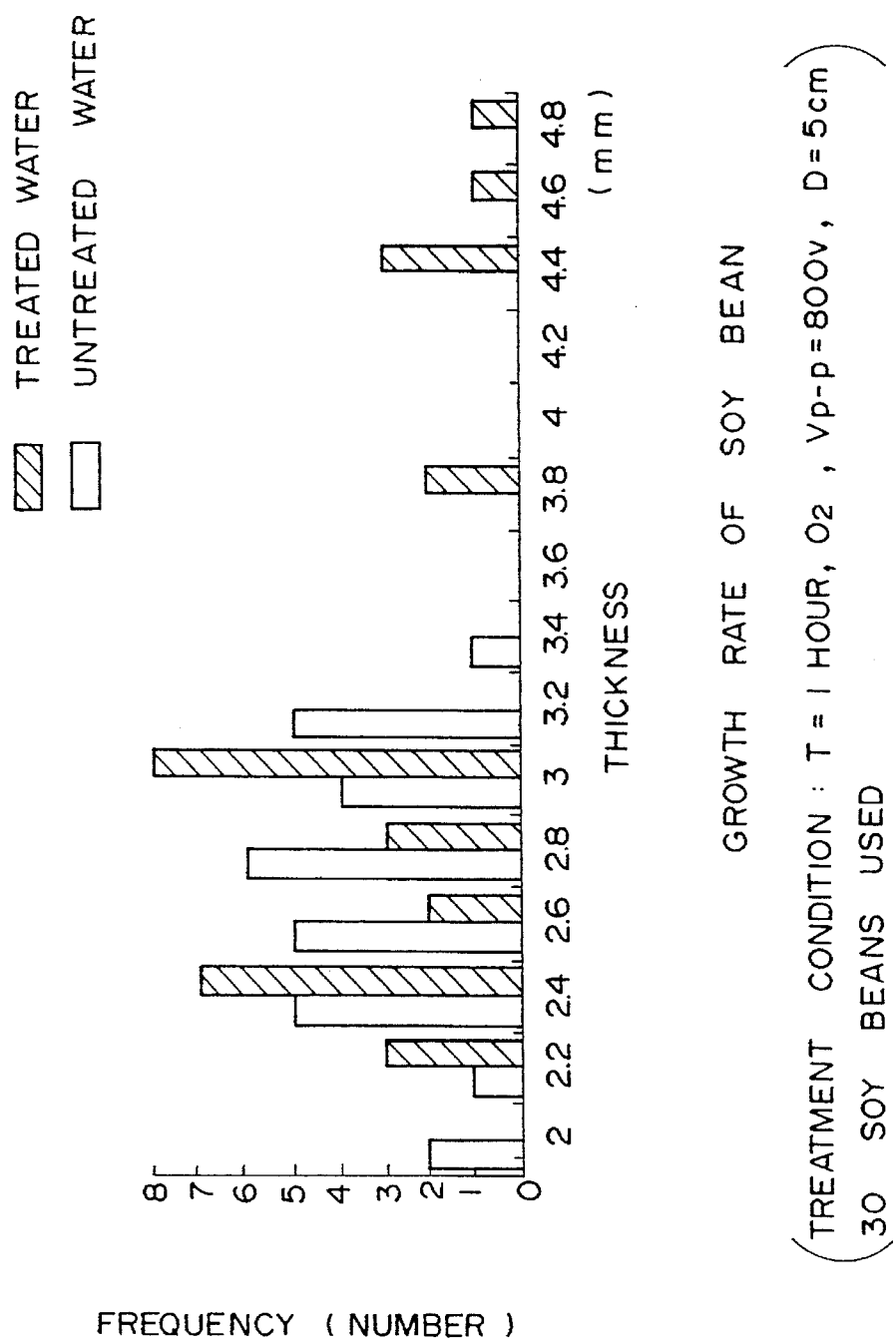
FIG. 28 is a graph illustrating a growth rate of the soy beans as a function of a thickness of the vein.

As apparent from FIGS. 27 and 28, it was revealed that the soy beans grew well with the modified water (the water improving the liquid quality).

Property 4: Effect on Water Retention of Skin

Figure 29:
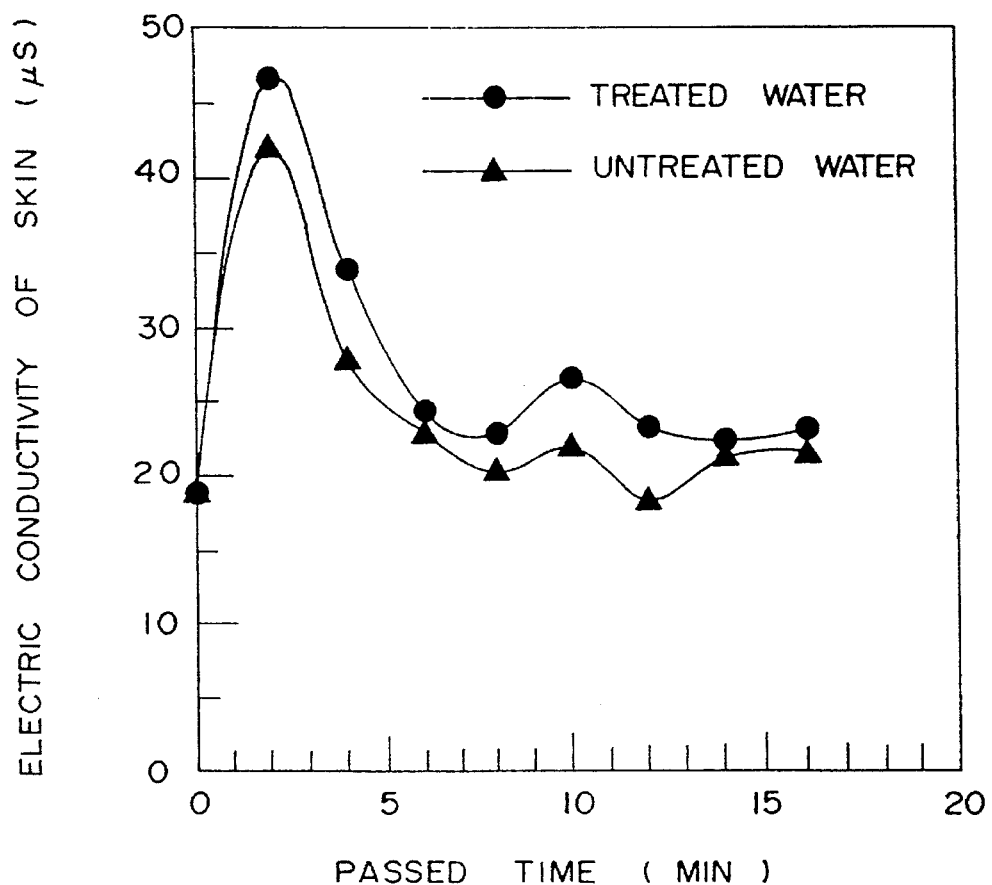
FIG. 29 is a graph illustrating a water retention property of skin.

A mixture of water (3 cc) and cosmetic liquid (0.1 cc) was applied to the back of the hand over 1 minute to determine change with time of water retained in the skin. The water retention of the skin was obtained by using a device for obtaining it according to electric conductivity of the skin. Modification of water was conducted under the conditions: treatment time T=1 hour, gas used; $O_2$, vibrator driving voltage; V=800 $V_{p-p}$, and chamber inner diameter; D=5 cm. The results are given in FIG. 29. The results revealed that, as shown in FIG. 29, the higher water retention can be provided with the modified water.

Property 5: Effect on Durability of Cut Flowers

A vein of a rose was cut perpendicularly and was dipped into water. At this state, petals were observed. Modification of water was conducted under the conditions:: treatment time T=1 hour, gas used; $O_2$, vibrator driving voltage; V=800 $V_{p-p}$, and chamber inner diameter; D=4.5 cm. As a result, the petals were fallen off after 7 days with the untreated water. On the other hand, the petals were kept well after 12 days with the modified water.

As mentioned above, according to the present invention, there is provided with a liquid treating method in which bubbles of a gas are formed in a liquid phase and are compressed by using collision of the opposing vibration waves to dissolve the bubbles into the liquid phase.

In addition, according to the present invention, there is provided with a liquid treating apparatus comprising a chamber for holding or storing a liquid in, a vibrator for applying an vibration wave to the liquid, and bubble forming means for forming bubbles of a gas in the liquid. The bubbles are dissolved into the liquid through compression of bubbles by using collision of vibration waves in the chamber.

Accordingly, the present invention allows effective dissolution of gases into a liquid phase in various fields requiring dissolution of a gas including hydroponic, cultural, chemical, and enzyme industries as well as for treating water, fuel, and exhaust gas. The present invention can improve efficiency of hydroponic cultivation, enhance effective feeding of oxygen to cultured fishes, shells and so on in a farm, and reduce a fermentation period required to fermentate sake or the like. As a result, it becomes possible to reduce instrument costs, improve treatment efficiency, and increase reaction speed in these fields.

It has been revealed experimentally that the water modified according to the method of the present invention has different properties from those of the untreated water. Accordingly, it is possible to provide a method of allowing effective modification of water around a high-temperature, high-field formed as a result of collision of the strong vibration waves on the bubbles formed by superposing the vibration waves.

In addition, there is provided with an apparatus which comprises a chamber for holding or storing a liquid in, a vibrator for applying an vibration wave to the liquid, bubble forming means for forming bubbles of a gas in the liquid, and a temperature controller for water treatment, and which allows effective modification of water around a high-temperature, high-field formed as a result of collision of the strong vibration waves on the bubbles formed by superposing the vibration waves.

As mentioned above, according to the present invention, a liquid can be modified effectively only by with a chamber, a liquid, a gas, vibrators, and a temperature controller. In addition, it becomes possible to adjust the degree of modification based on the vibrator amplitude, treatment time, and types of the gas introduced.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application Nos. 338529/1993 filed on Dec. 28, 1993; 178407/1994 filed on Jul. 29, 1994; and 318199/1994 filed on Dec. 21, 1994 are hereby incorporated by reference.

What is claimed is:

1. A method for dissolving gas into liquid, comprising:
   introducing gas into liquid in a spherical chamber to generate bubble of the gas in the liquid; and
   applying vibration waves including sound waves and ultrasonic waves to the spherical chamber from directions opposite to each other through the spherical chamber to cause the spherical chamber to resonant, whereby to apply compressive pressure to the bubble from all of the three-dimensional directions thereof to dissolve the gas in the liquid.

2. A method according to claim 1, wherein a vibration frequency of the vibration waves is n * f, wherein n is an integer and f is a fundamental resonance frequency given by the following equation:

$$f=V/D \text{ (Hz)},$$

where D (m) is an inner diameter of the spherical chamber, and V (m/sec) is a sound wave velocity of the vibration wave in the liquid.

3. A method according to claim 1, wherein the liquid is aqueous liquid.

4. A method of producing an activated chemical species in aqueous liquid, comprising the steps of:
   applying vibration waves including sound waves and ultrasonic waves to the spherical chamber from directions opposite to each other through the spherical chamber to cause the spherical chamber to resonant, whereby to apply compressive pressure to bubble of the gas in the liquid from all of the three-dimensional directions to generate a pressurized and heated area whereby to produce an activated chemical species in the aqueous liquid.

5. A method according to claim 4, wherein the amount of the activated chemical species produced is at least in the order of about $3\times5^{-5}$ mol/l or more in a conversion into the amount of the liquid.

6. A method according to claim 5, wherein a temperature of the aqueous liquid is kept at from 0° C. to 10° C.

7. A method for treating liquid as claimed in claim 5, wherein a vibration frequency of the vibration waves is n * f, wherein n is an integer and f is a fundamental resonance frequency given by the following equation:

$$f=V/D \text{ (Hz)},$$

where D (m) is an inner diameter of the spherical chamber, and V (m/sec) is a sound wave velocity of the vibration wave in the liquid.

8. An apparatus for dissolving gas into liquid, comprising:
   a spherical chamber for holding liquid;
   at least one pair of vibration generators disposed on the symmetrical portions of the spherical chamber with respect to a center of the chamber to cause the chamber to resonate; and
   bubble generating means for generating a bubble in the liquid in the spherical chamber, when liquid is filled in the chamber, bubble of the gas being continuously generated into the liquid in the spherical chamber;
   wherein said bubble generating means introduce the bubble into the liquid, and vibration waves generated by said vibration generators are directed in the direction of the center of said spherical chamber to apply compression pressure to the bubble of the gas from all of the three dimensional direction thereof.

9. An apparatus for treating liquid as claimed in claim 8 further comprising:

vibration detecting means for detecting an amplitude of the vibration wave with respect to said spherical chamber to provide information regarding detected amplitude; and vibration controlling means receiving the information for controlling the vibration generated by the vibration generators in response to the information provided by said vibration detecting means, wherein the vibration controlling means control the vibration generated by said vibration generators such that the amplitude of the vibration wave detected by said vibration detecting means becomes maximum.

10. An apparatus according to claim 9, wherein said vibration generators comprise a piezoelectric vibrator.

11. An apparatus according to claim 10, wherein said vibration detecting means is one of a microphone and a piezoelectric vibrator disposed on a wall defining said spherical chamber.

12. An apparatus according to claim 10, wherein said vibration controlling means is an AC voltage generator constructed and arranged to be set at a predetermined frequency.

13. An apparatus according to claim 12, wherein said vibration controlling means comprises a feedback system which monitors an amplitude of the vibration of said spherical chamber detected by said vibration detecting means and a current flowing through said piezoelectric vibrator, so as to control frequency of alternating voltage applied to said piezoelectric vibrator.

14. An apparatus according to claim 8, wherein said spherical chamber comprises:

a liquid containing unit for containing the liquid; and a gas filling unit, for filling gas for use in forming the bubble, disposed in a space over the liquid surface of the contained liquid; and wherein said bubble generating means comprises:

a pump for use in feeding a predetermined liquid; and a nozzle for use in dropping continuously or intermittently the predetermined liquid fed by said pump from said gas filling unit onto the liquid surface of the liquid contained in said liquid containing unit, a bubble introducing end of said nozzle being disposed within a space of said gas filling unit.

15. An apparatus according to claim 8, wherein said spherical chamber comprises:

a liquid containing unit for containing the liquid; and a gas filling unit, for filling as to form the bubbles, disposed in a space over the liquid surface of the liquid contained; and wherein said bubble generating means comprises:

a pump for use in feeding the gas in the liquid containing unit; and a nozzle for use in introducing the gas fed by the pump into the liquid, a bubble introducing end of said nozzle being disposed within the liquid contained in said liquid containing unit.

16. An apparatus according to claim 8 further comprising liquid temperature adjusting means for adjusting a temperature in said spherical chamber.

\* \* \* \* \*